US011575641B2

(12) United States Patent
Ikeda et al.

(10) Patent No.: US 11,575,641 B2
(45) Date of Patent: Feb. 7, 2023

(54) ESTIMATING DEVICE, ESTIMATING METHOD, AND ESTIMATING PROGRAM

(71) Applicant: NEC Corporation, Tokyo (JP)

(72) Inventors: Keisuke Ikeda, Tokyo (JP); Kazufumi Kojima, Tokyo (JP); Masahiro Tani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/578,619

(22) Filed: Jan. 19, 2022

(65) Prior Publication Data

US 2022/0239620 A1    Jul. 28, 2022

(30) Foreign Application Priority Data

Jan. 26, 2021   (JP) .............................. JP2021-010696

(51) Int. Cl.
*G06F 15/16*    (2006.01)
*H04L 51/52*    (2022.01)
*H04L 51/04*    (2022.01)

(52) U.S. Cl.
CPC .............. *H04L 51/52* (2022.05); *H04L 51/04* (2013.01)

(58) Field of Classification Search
CPC ......... H04L 51/52; H04L 51/04; H04L 51/22; G06Q 50/01
See application file for complete search history.

(56) References Cited

U.S. PATENT DOCUMENTS

| | | | |
|---|---|---|---|
| 10,871,877 B1* | 12/2020 | Clediere | ................. G06Q 50/01 |
| 2011/0029463 A1* | 2/2011 | Forman | ................. G06F 16/355 |
| | | | 707/E17.09 |
| 2011/0219422 A1* | 9/2011 | Shen | ................. G06F 21/00 |
| | | | 709/204 |
| 2016/0110381 A1* | 4/2016 | Chen | ................. G06Q 50/01 |
| | | | 707/609 |
| 2017/0064015 A1* | 3/2017 | Davis | ................. H04L 67/52 |
| 2017/0255868 A1* | 9/2017 | Gelinas | ................. H04W 4/02 |

(Continued)

OTHER PUBLICATIONS

Keisuke Ikeda, Kazufumi Kojima, and Masahiro Tani, "Study on Technique of Estimating Area of Residence with Focus on Geographical Proximity Among Group of Friends", The Institute of Electronics, Information and Communication Engineers, IEICE technical report, vol. 119, No. 317, pp. 37-42, AI2019-36, Nov. 2019.

(Continued)

*Primary Examiner* — John B Walsh
(74) *Attorney, Agent, or Firm* — Sughrue Mion, PLLC

(57) ABSTRACT

Provided is an estimating device, an estimating method, and an estimating program that each make it possible to estimate the area of activity of a target user with a smaller amount of information. An estimating device includes a first position distribution generating unit configured to generate a first position distribution of a target user on social media based on account information of the target user, a second position distribution generating unit configured to generate a second position distribution of a friend who is friends with the target user on the social media based on account information of the friend, and an estimating unit configured to estimate an area of activity of the target user based on the generated first position distribution and the generated second position distribution.

19 Claims, 15 Drawing Sheets

(56) References Cited

U.S. PATENT DOCUMENTS

2018/0174190 A1\* 6/2018 Ferreira ................ G06Q 50/01
2021/0279962 A1\* 9/2021 Hutten ................... G06T 19/20

OTHER PUBLICATIONS

Dan Xu, Peng Cui, Wenwu Zhu, and Shiqiang Yang, "Graph-based residence location inference for social media users", IEEE Computer Society, IEEE Multi Media, vol. 21, Issue 4, pp. 76-83, Oct. 2014.

\* cited by examiner

ESTIMATING DEVICE, ESTIMATING METHOD, AND ESTIMATING PROGRAM

INCORPORATION BY REFERENCE

This application is based upon and claims the benefit of priority from Japanese patent application No. 2021-010696, filed on Jan. 26, 2021, the disclosure of which is incorporated herein in its entirety by reference.

TECHNICAL FIELD

The present disclosure relates to estimating devices, estimating methods, and estimating programs.

BACKGROUND ART

In recent years, social media, such as social networking service (SNSs), have spread around the world and are widely used. Since a large amount of information concerning users with an account and those users' friends accumulates daily in social media, studies are being done on the method of analyzing and utilizing such information.

As some related techniques, techniques for estimating the position of a user based on information from social media are known, as disclosed in Non-Patent Literatures 1 and 2. Non-Patent Literature 1 discloses a method of estimating an area of activity of a target user by use of information concerning, among friends who are friends with the target user on social media, a friend who interacts with the target user also in the real world (an offline friend). Non-Patent Literature 2 discloses a method of estimating the position of a user based on the user's friends and the content including text that the user has generated.

NPL 1: Keisuke Ikeda, Kazufumi Kojima, and Masahiro Tani. "Study on Technique of Estimating Area of Residence with Focus on Geographical Proximity Among Group of Friends," The Institute of Electronics, Information and Communication Engineers, IEICE technical report, Vol. 119, No. 317, pp. 37-42, AI2019-36, November, 2019.

NPL 2: Dan Xu, Peng Cui, Wenwu Zhu, and Shiqiang Yang. "Graph-based residence location inference for social media users," IEEE Computer Society, IEEE MultiMedia, Volume 21, Issue 4, pp. 76-83, October, 2014.

SUMMARY

However, the technique disclosed in Non-Patent Literature 1 requires advance training with use of a large amount of data for identifying offline friends. In addition, since the technique disclosed in Non-Patent Literature 2 estimates the position by use of label propagation, which is one of the semi-supervised learning algorithms, the technique requires advance training with use of a large amount of data to generate a learning model. Accordingly, related techniques such as those disclosed in Non-Patent Literatures 1 and 2 require a large amount of information to be prepared in advance to estimate the area of activity of a target user.

The present disclosure has been made in view of such issues and is directed to providing an estimating device, an estimating method, and an estimating program that each make it possible to estimate the area of activity of a target user with a smaller amount of information.

An estimating device according to the present disclosure includes a first position distribution generating unit configured to generate a first position distribution of a target user on social media based on account information of the target user, a second position distribution generating unit configured to generate a second position distribution of a friend who is friends with the target user on the social media based on account information of the friend, and an estimating unit configured to estimate an area of activity of the target user based on the generated first position distribution and the generated second position distribution.

An estimating method according to the present disclosure includes generating a first position distribution of a target user on social media based on account information of the target user, generating a second position distribution of a friend who is friends with the target user on the social media based on account information of the friend, and estimating an area of activity of the target user based on the generated first position distribution and the generated second position distribution.

An estimating program according to the present disclosure is an estimating program that causes a computer to execute the processes of generating a first position distribution of a target user on social media based on account information of the target user, generating a second position distribution of a friend who is friends with the target user on the social media based on account information of the friend, and estimating an area of activity of the target user based on the generated first position distribution and the generated second position distribution.

BRIEF DESCRIPTION OF DRAWINGS

The above and other aspects, features and advantages of the present disclosure will become more apparent from the following description of certain exemplary embodiments when taken in conjunction with the accompanying drawings, in which.

EMBODIMENTS

Figure 1:
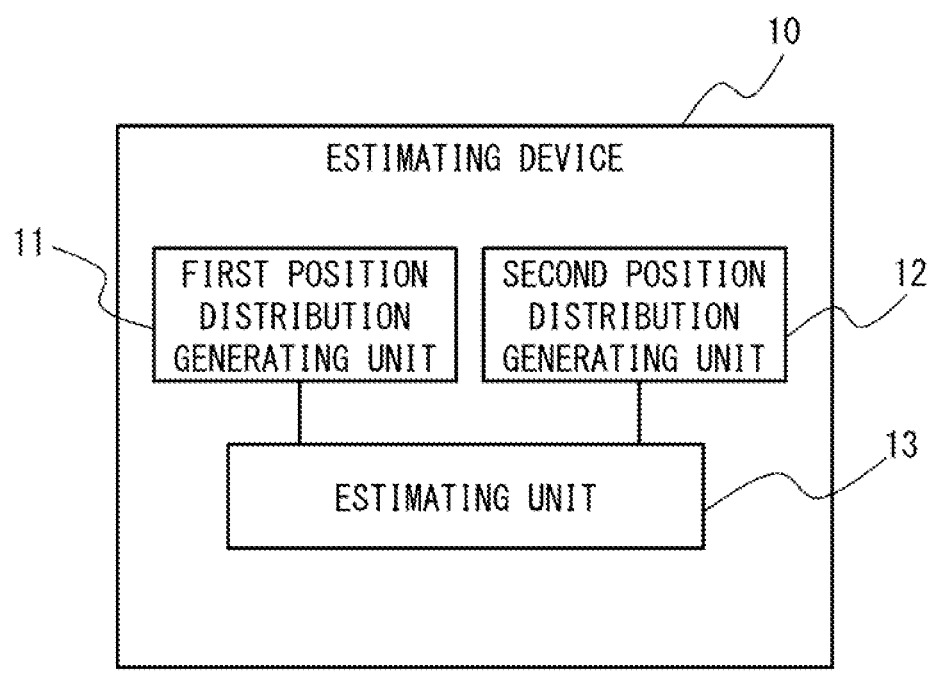
FIG. 1 is a configuration diagram illustrating an overview of an estimating device according to some example embodiments.

Hereinafter, some example embodiments will be described with reference to the drawings. In the drawings, identical elements are given identical reference characters, and their repetitive descriptions will be omitted, as necessary.

Overview of Example Embodiments

An area of activity including an area of residence of a target user can be acquired from social media. Many social media platforms allow users to post their profile, such as their username, sex, or age, and the users can also set their area of residence or the like as part of their profile. Moreover, when a user posts content, such as a moving image or text, on a social media platform, the user can also associate, with the posted content, information indicating, for example, the location where that content has been captured or his or her current location. However, even though users can register their position information in their profile or posted content, very few users actually register their position information. Accordingly, some example embodiments propose a method of estimating position information associated with a target user based on information obtained from social media.

FIG. 1 illustrates an overview of an estimating device according to some example embodiments. An estimating device 10 according to one example embodiment estimates an area of activity of a target user in a physical space by use of information from social media. For example, the estimating device 10 can be used as a means for acquiring location information when doing marketing such as geomarketing or location-based marketing, where a target user is given recommendations associated, for example, with his or her area of residence or area of activity. This makes it possible to provide recommendations that match not merely with simple preferences. It is to be noted that the estimating device 10 can be used not only in marketing but also in other fields.

As illustrated in FIG. 1, the estimating device 10 includes a first position distribution generating unit 11, a second position distribution generating unit 12, and an estimating unit 13. The first position distribution generating unit 11 generates a first position distribution of a target user based on account information of the target user on social media. For example, the first position distribution generating unit 11 may generate a posting distribution based on posted information (posting locations) of the target user.

The second position distribution generating unit 12 generates a second position distribution of a friend who is friends with the target user on social media based on account information of the friend. For example, the second position distribution generating unit 12 may generate a friend distribution based on base of activity information (area of residence information) of the friend.

The estimating unit 13 estimates an area of activity of the target user based on the generated first position distribution and the generated second position distribution. For example, the estimating unit 13 may estimate the area of activity of the target user based on an overlap between the first position distribution and the second position distribution. Alternatively, the estimating device 10 may generate a first position distribution and a second position distribution through a non-parametric technique, such as a kernel density estimation function, and estimate the area of activity. One of the first position distribution and the second position distribution may be generated through a non-parametric technique. The area of activity to be estimated may be an area of activity, a usual location of activity where the target user visits regularly in his or her daily life (the area of residence, the workplace, a store where the target user visits for shopping, eating, or drinking, a traveling route therebetween, etc.), or a non-usual location of activity where the target user does not visit regularly in his or her daily life (a tourist spot or a hotel where the target user visits or stays on a trip or a business trip, a traveling route that the target user takes on a trip or a business trip, etc.).

In this manner, according to some example embodiments, the use of the position distribution obtained from the account information of the target user and the position distribution obtained from the account information of his or her friend makes it possible to estimate an area of activity (including a position of activity) of the target user with a smaller amount of information. For example, some example embodiments may be able to estimate the area of activity even when only one of the posted information of the target user and the friend information of his or her friend is available. When these two pieces of information are both available, the area of activity can be estimated with higher accuracy by combining these two pieces of information. Meanwhile, the use of a non-parametric technique that does not require a large amount of data to be collected makes it possible to reduce the cost of collecting social data with restrictions on data collection.

First Example Embodiment

Figure 2:
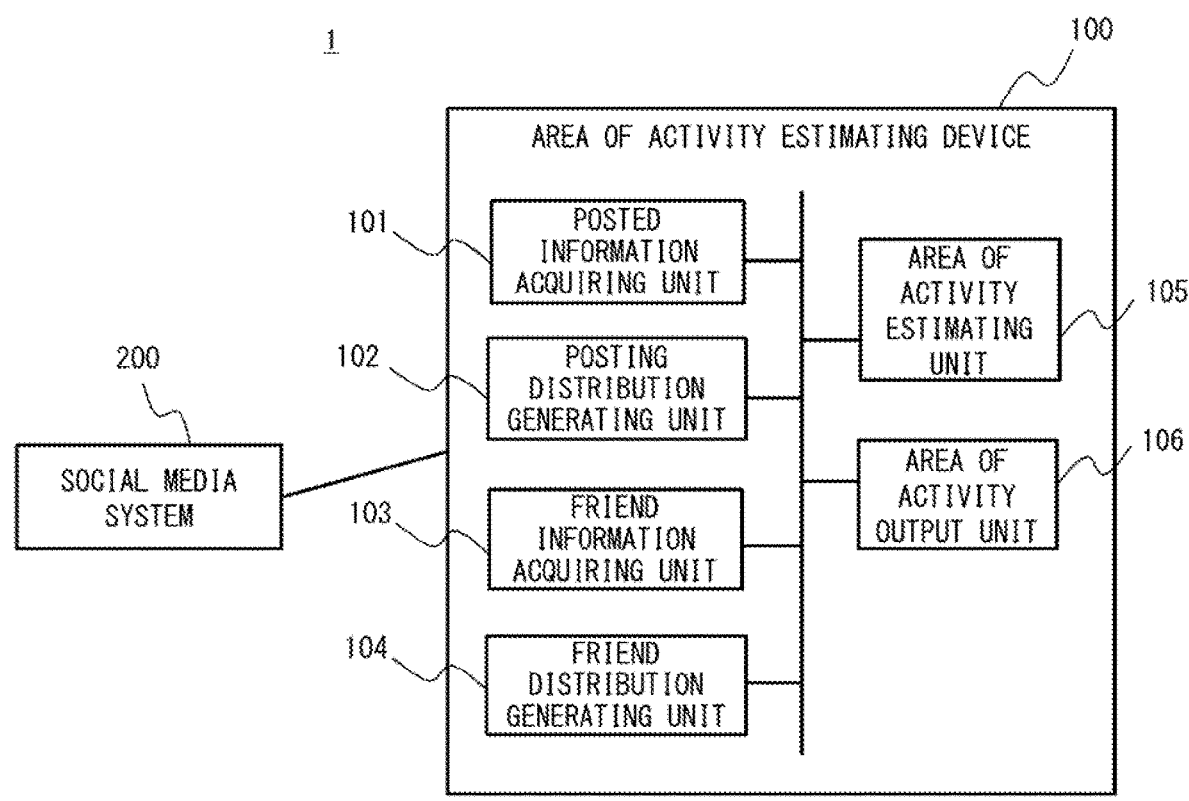
FIG. 2 is a configuration diagram illustrating an example of a configuration of an area of activity estimating system according to a first example embodiment.

Now, a first example embodiment will be described with reference to the drawings. FIG. 2 illustrates an example of a configuration of an area of activity estimating system according to the present example embodiment. As illustrated in FIG. 2, an area of activity estimating system 1 according to the present example embodiment includes an area of activity estimating device 100 and a social media system 200.

The social media system 200 provides a social media service, such as an SNS. The social media system 200 may include a plurality of social media services. A social media service is an online service where users can share (publish) information among a plurality of accounts (users) and communicate with each other over the internet (online). A social media service is not limited to an SNS and includes a messaging service such as a chat, a blog, an electronic bulletin board (a forum site), a video sharing site, an information sharing site, a social game, and a social bookmark.

For example, the social media system 200 includes a server on a cloud and a user terminal. The server may be a social media server or a web server. The user terminal allows the user to log in to his or her account via the application programming interface (API) provided by the server, submit a post or browse through posts, or register account connections through friending or following. The social media system 200 and the area of activity estimating device 100 are connected to and can communicate with each other via the internet or the like.

The area of activity estimating device 100 includes a posted information acquiring unit 101, a posting distribution generating unit 102, a friend information acquiring unit 103, a friend distribution generating unit 104, an area of activity estimating unit 105, and an area of activity output unit 106. The configuration of these units (blocks) is an example, and the area of activity estimating device 100 may be constituted by a different set of units as long as the area of activity estimating device 100 can perform the operation (the method) described later. Moreover, these units may be included in one device or in a plurality of devices. For example, the posted information acquiring unit 101 and the posting distribution generating unit 102 may constitute a first position distribution generating unit, and the friend information acquiring unit 103 and the friend distribution generating unit 104 may constitute a second position distribution generating unit.

The posted information acquiring unit (a target account information acquiring unit) 101 acquires posted information of a target account from the social media system 200. The posted information acquiring unit 101 also serves as a target account identifying unit that identifies a target account of a target user whose area of activity is to be estimated. For example, a target user is a person serving as a marketing target but may also be any desired person. The posted information acquiring unit 101 acquires account information (social media information) of an identified target account from the social media system 200. This account information is open information concerning the account on social media and includes, for example, profile information or posted information of the account. The posted information acquiring unit 101 may acquire account information from a plurality of social media platforms. The posted information acquiring unit 101 may acquire account information from a server providing a social media service via an API or a crawler (an acquiring tool) or from a database storing in advance the account information on social media.

The posted information acquiring unit 101 acquires all the posted information from the account information of the target account. The posted information includes, for example, images and text that the account (the user) has posted on the timeline or the like. The posted information acquiring unit 101 extracts the posting location and the posting date and time from an image or text included in the acquired posted information. The posting location indicates the location where the target user has posted the posted information. The posting date and time indicates the date and time when the target user has posted that posted information. The posting date and time is registered at the time of posting with the posting date and time associated with the posted image or text. The posting location serves as the position information that can be extracted from the posted information and may be a GEO tag, such as global positioning system (GPS) information, appended to the posted image or the position identified based on a landmark or the like captured in the posted image. The posting location may also be extracted from a location mentioned in a posted message (text), instead of being extracted from an image. The location mentioned in a posted message is extracted, for example, through natural language processing performed on the posted message. The posting location is an example of position information for estimating a location of activity of the target user (a location bearing relation to the target user) based on the account information of the target user. The posting location is not limited to a location of posting and may instead be a base of activity, such as the area of residence, included in profile information.

The posting distribution generating unit 102 generates a posting distribution (a first position distribution) of a target account based on the posted information of the target account. The posting distribution generating unit 102 generates a posting distribution of extracted posting locations of the target account. The posting distribution is a distribution of posting locations (posting positions) in a physical space (a spatial distribution specific to the posting position) and is, for example, a two-dimensional geographical spatial distribution consisting of the latitude and longitude coordinates. For example, the posting distribution is a distribution of posting locations per unit distribution area of a predetermined size. The granularity level of a distribution area may be an administrative section, such as a country, a prefecture, or a municipality, or may be a mesh of a predetermined size, such as a one kilometer by one kilometer mesh, a hundred meter by hundred meter mesh, or a ten meter by ten meter mesh.

The posting distribution generating unit 102 obtains the posting distribution through a predetermined distribution function. The use of a density estimation function of estimating a distribution through a non-parametric technique is preferable. According to the present example embodiment, the kernel density estimation function is used as an example of the density estimation function of a non-parametric technique. When the posting distribution is generated (calculated), each piece of posted information may be assigned a weight based on the posted information. For example, the posted information may be assigned a weight based on its posting date and time. The distribution function is not a limiting example, and the posting distribution may be obtained through any other statistical process. For example, the posting distribution (a histogram) may be generated by counting the number of posting locations included in each distribution area.

The friend information acquiring unit 103 acquires friend information of a friend account from the social media system 200. The friend information acquiring unit 103 also serves as a friend account identifying unit that identifies a friend account of a target user. A friend account is an account connected to the target account as a friend or the like on social media. A friend account may be an account on the same social media platform that the target user is on or an account on a social media platform different from the one that the target user is on. For example, a friend account is an account registered as being friends with the target account or may be an account (a related account) that has a different kind of connection with (relation to) the target account. For example, a friend account may be an account connected in a follow relation (a following or a follower), an account connected through posting (commenting on a post, quoting through a retweet or the like, reacting such as liking, referring through a mention, etc.), or an account with a history of exchanging messages. A retweet refers to posting of a comment or the like with a post of another account or of one's own account quoted. A mention refers to posting of a comment or the like that includes a specific account name.

The friend information acquiring unit 103 acquires account information of the identified friend account from the social media system 200. The method of acquiring information from the social media system 200 is similar to the method employed by the posted information acquiring unit 101, and the friend information acquiring unit 103 acquires the account information through an API or the like of the server. The friend information acquiring unit 103 extracts friend information from the acquired account information of all the friend accounts. The friend information is the position information concerning the friend account and is, for example, the area of residence (including the place of residence) extracted from the account information. The friend information acquiring unit 103 extracts area of residence information from the profile information included in the account information. Information to be extracted is not limited to the area of residence, and any other base of activity, such as the hometown, the workplace, or the school, may be extracted. The friend information is an example of position information for estimating a location of activity of the friend (a location bearing relation to the friend) based on the account information of the friend. The friend information is not limited to a base of activity, such as the area of residence, and may instead be a posting location of posted information, for example.

The friend distribution generating unit 104 generates a friend distribution (a second position distribution) of the friend account based on the friend information (the base of activity) of the friend account. The friend distribution generating unit 104 generates a friend distribution of extracted places of residence of friend accounts. As with the posting distribution, the friend distribution is a distribution of places of residence of friends (friend positions) in a physical space (a spatial distribution specific to the places of residence of the friends). The granularity level of the distribution area of the friend distribution is identical to that of the posting distribution or may be different from the granularity of the posting distribution. As with the posting distribution generating unit 102, the friend distribution generating unit 104 obtains the friend distribution through a distribution function of a non-parametric technique, such as the kernel density estimation function, or may obtain the friend distribution through any other statistical process. When the friend distribution is generated (calculated), each piece of area of residence information may be assigned a weight based on the area of residence information.

The area of activity estimating unit 105 estimates an area of activity of the target user based on the generated posting distribution and the generated friend distribution. The area of activity estimating unit 105 generates the area of activity distribution of the target user by superposing the posting distribution and the friend distribution on each other. The granularity level of the area of activity distribution to be generated is identical to the granularity of the posting distribution or the friend distribution or both or may be different from the granularity of either of the posting distribution and the friend distribution. The area of activity estimating unit 105 estimates the area of activity based on an overlap (an amount of overlap) between the posting distribution and the friend distribution. An overlap between these distributions is expressed by a score of each of the posting distribution and the friend distribution obtained through the kernel density estimation function. In other words, the area of activity estimating unit 105 estimates the area of activity based on the score of the posting distribution obtained through the kernel density estimation function and the score of the friend distribution obtained through the kernel density estimation function. The area of activity estimating unit 105 estimates the area of activity based on a result of a predetermined calculation performed on the score of the posting distribution and the score of the friend distribution that are each obtained through the kernel density estimation function. For example, the area of activity estimating unit 105 obtains the product of the score of the posting distribution and the score of the friend distribution and designates an area with the highest score as the area of activity. The calculation is not limited to a multiplication, and an addition, a subtraction, or the like may instead be employed. The area of activity estimating unit 105 can estimate a usual area of activity of the target user by multiplying or adding the score of the posting distribution and the score of the friend distribution. The area of activity estimating unit 105 can estimate a non-usual area of activity by subtracting the score of the friend distribution from the score of the posting distribution. The area of activity estimating unit 105 may designate an area with an obtained score of no lower than a predetermined value as the area of activity or designate areas with the top N scores (the top five scores or the like) as areas of activity.

The area of activity output unit 106 outputs the estimated area of activity. The area of activity output unit 106 may serve as a display device and display the area of activity in a predetermined format through a graphical user interface (GUI). The area of activity output unit 106 may display the posting distribution and the friend distribution and highlight the area where the distributions overlap each other. For example, the area of activity output unit 106 may display the score of each area of activity in a heat map format. Alternatively, the area of activity output unit 106 may output the result to the outside in a predetermined file format. For example, the area of activity output unit 106 may output the score of each area of activity in a list format and output only a predetermined number of items.

Figure 3:
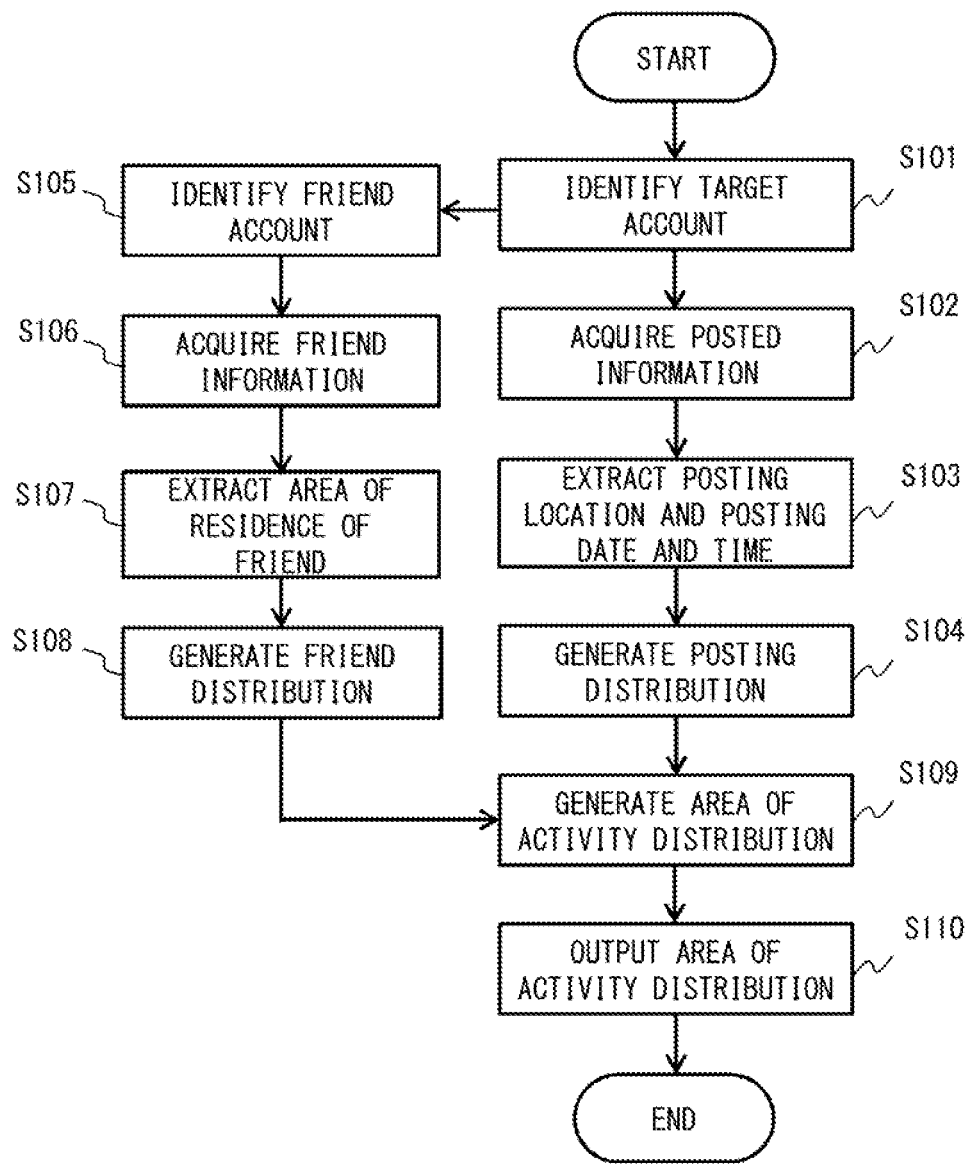
FIG. 3 is a flowchart illustrating an example of an operation of an area of activity estimating device according to the first example embodiment.

FIG. 3 illustrates an example of an operation (an area of activity estimating method) of the area of activity estimating device according to the present example embodiment. As illustrated in FIG. 3, first, the area of activity estimating device 100 identifies a target account of a target user (S101). The posted information acquiring unit 101 receives input of information concerning the target account and identifies the target account based on the input information. The posted information acquiring unit 101 may identify the account through the input of the account ID (identification information) of the target account or identify the account through a search of, for example, an input name or keyword on the social media or the internet.

Next, the area of activity estimating device 100 acquires posted information of the target account (S102). The posted information acquiring unit 101 accesses a server or a database of the social media system 200 and acquires the account information of the target account that is published and can be acquired. For example, the posted information acquiring unit 101 acquires the account information of the target account within a range accessible through the API or the like of the social media service. The posted information acquiring unit 101 acquires all the posted information included in the account information of the target account.

Next, the area of activity estimating device 100 extracts the posting location and the posting date and time of the posted information (S103). The posted information acquiring unit 101 extracts the posting location and the posting date and time from all the posted information of the target account. Instead of extracting the posting location and the posting date and time from all the posted information, the posted information acquiring unit 101 may extract the posting location and the posting date and time from a part of the posted information. For example, posted information that is older than a predetermined date and time may be excluded from the posted information from which the posting location and the posting date and time are to be extracted, or when two pieces of posted information share the same posted content, one of these two pieces of posted information may be excluded from the posted information from which the posting location and the posting date and time are to be extracted. When a GEO tag is appended to a posted image, the posted information acquiring unit 101 acquires the posting location (the position information) from the GEO tag. When no GEO tag is appended to a posted image, the posted information acquiring unit 101 may perform an image analysis on what is captured in the posted image and acquire the posting location based on the building, the scenery, or the like whose position can be identified. When the posted information acquiring unit 101 cannot acquire the position information from a posted image, the posted information acquiring unit 101 may perform natural language processing on the text of the posted message and acquire the posting location based on the word that allows the position to be identified. When the posted information acquiring unit 101 cannot acquire the posting location from the posted information, the posted information acquiring unit 101 may exclude that posted information from the information for generating a posting distribution. The posted information acquiring unit 101 acquires the date and time appended to the posted information as the posting date and time.

Next, the area of activity estimating device 100 generates a posting distribution of the target account (S104). The posting distribution generating unit 102 generates the posting distribution based on the posting location and the posting date and time of each of the extracted plurality of pieces of posted information. In this example, the posting distribution generating unit 102 obtains the posting distribution $p(L_p)$ through the expression (1) below by use of the kernel density estimation function. The posting distribution $p(L_p)$ is a set of kernel density estimation values (scores) of the posted information in each distribution area.

$$p(L_p) = \frac{1}{|p|h_p} \sum_{1}^{p} w_p K_p(l_p) \quad (1)$$

In the expression (1), $l_p$ is a set of posting locations, $h_p$ is the bandwidth for posting, $w_p$ is the weight for posting, and $K_p$ is the kernel function for posting. The bandwidth is a parameter indicating a range of influence of each sample in the kernel density estimation. The bandwidth for posting takes a predetermined value for a posting distribution. The bandwidth for posting may be set in advance or may take a value obtained in advance through training on a plurality of posting locations. The bandwidth for posting may be changed in accordance with the output area of activity (the result of the estimation).

Figure 4:
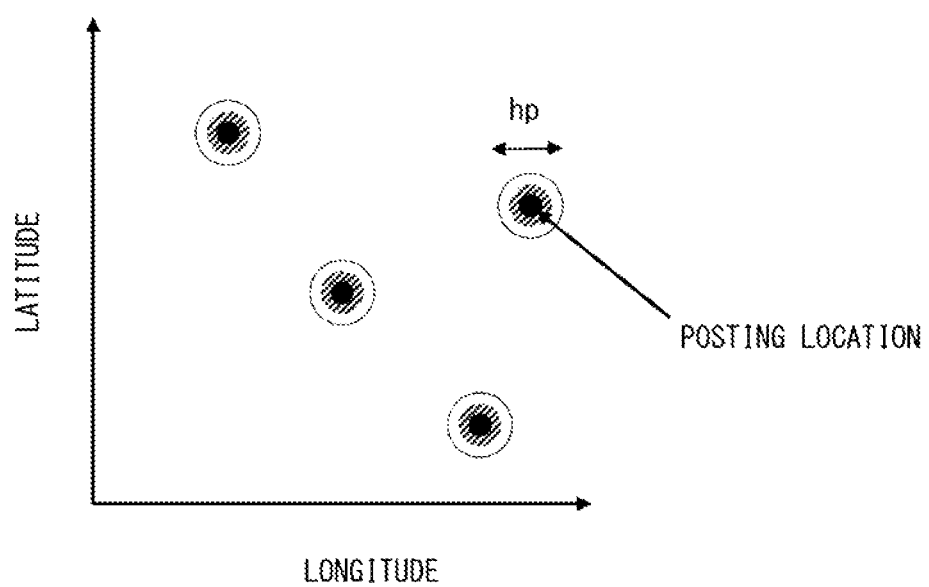
FIG. 4 illustrates an example of how a posting distribution is generated according to the first example embodiment.

FIG. 4 provides an image of a posting distribution obtained through the kernel density estimation. As illustrated in FIG. 4, the posting location of each piece of posted information is plotted on the two-dimensional coordinates of the latitude and the longitude, and with the posting location lying at the center, each distribution indicates the range of influence of the bandwidth for posting (e.g., a normal distribution circle). In the range of influence of each posting location (sample), the center (the posting location) has the highest score, and the score decreases as the distance from the center increases. In the illustrated example, the higher the score, the denser the color.

Figure 5:
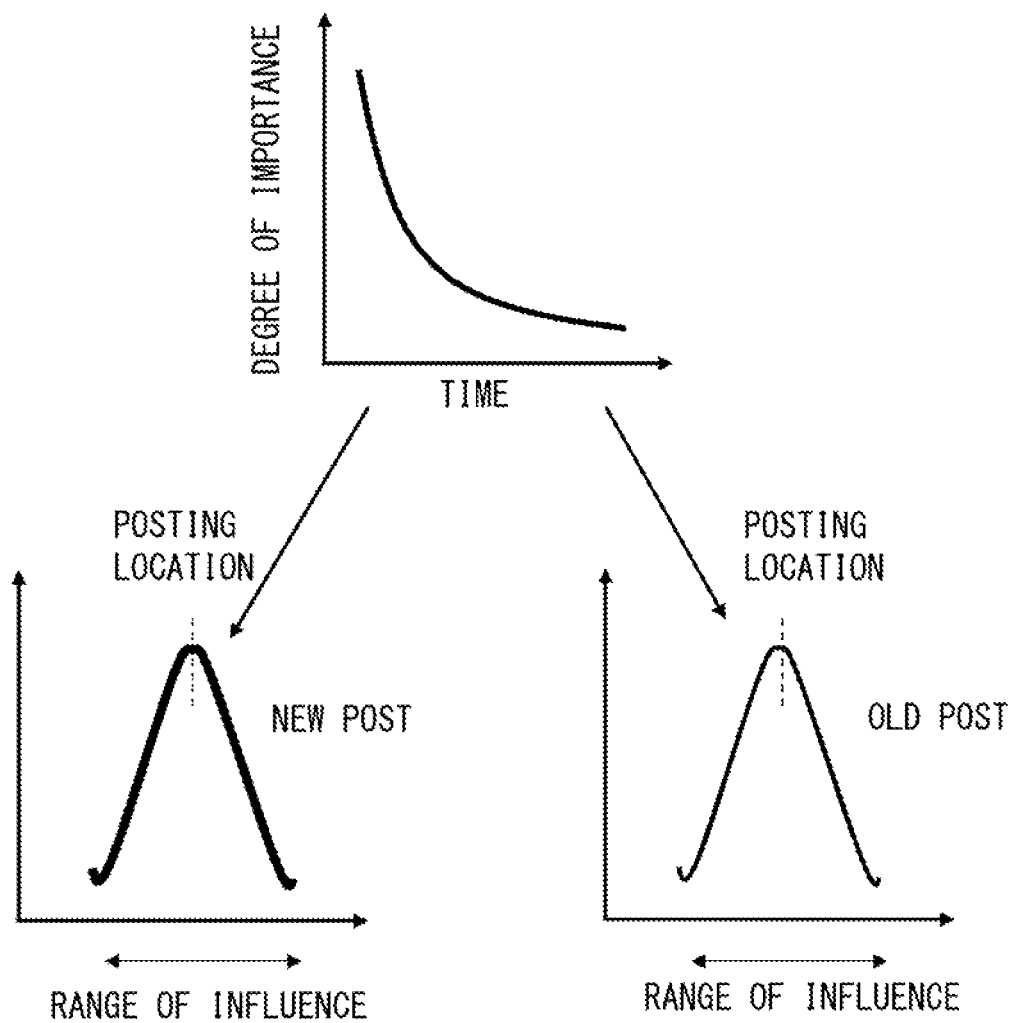
FIG. 5 is an illustration for describing an example of how a posting distribution is generated according to the first example embodiment.

The weight for posting in the expression (1) is a weight of the posted information in the posting distribution that is based on each piece of posted information. The weight for posting indicates the degree of importance of each piece of posted information and sets the magnitude of the score. In one example, the weight for posting is a weight that is based on the posting date and time of the posted information. For example, as illustrated in FIG. 5, the degree of importance of posted information is inversely proportional to the elapsed time, and the importance decreases as the time passes. Therefore, a higher weight is assigned to a newer piece of posted information (raise the importance), and a lower weight is assigned to an older piece of posted information (lower the importance). Changing the weight in the expression (1) in accordance with the posting date and time does not change the range of influence but can raise the score of a newer piece of information and lower the score of an older piece of information.

Meanwhile, after identifying the target account (S101), the area of activity estimating device 100 identifies a friend account (S105). The friend information acquiring unit 103 identifies the friend account that is friends with the target account based on the account information of the target account. For example, the friend information acquiring unit 103 designates an account that is registered as a friend in the account information of the target account as the friend account. Alternatively, the friend information acquiring unit 103 may designate, as the friend account, an account that is in the following or follower relation in the posting of the target account, an account with posted information quoting the posted information of the target account, an account that has, for example, liked the posted information of the target account, or an account that has exchanged messages with the target account.

Next, the area of activity estimating device 100 acquires friend information of the friend account (S106). As in the case of acquiring the account information of the target account, the friend information acquiring unit 103 acquires the account information of all the friend accounts from a server or the like of the social media system 200 within a range accessible through the API or the like of the social media service.

Next, the area of activity estimating device 100 extracts area of residence information of the friend account (S107). The friend information acquiring unit 103 extracts the area of residence information from the account information of all the acquired friend accounts. The friend information acquiring unit 103 acquires profile information in the account information of each friend and acquires the area of residence information registered in the profile information. When the friend information acquiring unit 103 cannot acquire the area of residence from the profile information, the friend information acquiring unit 103 may use a base of activity, such as the hometown, the workplace, or the school, registered in the profile information as the area of residence information. The friend information acquiring unit 103 may extract the posting location from posted information and use a location that serves as a posting location frequently as the area of residence information. Alternatively, when the friend information acquiring unit 103 cannot acquire the area of residence information from the account information of a friend account, the friend information acquiring unit 103 may estimate the area of residence of that friend based on the account information of that friend's friend (another friend) who is friends with that friend. For example, the friend information acquiring unit 103 may estimate the area of residence of a friend in interest based on a distribution of places of residence obtained from the account information of a friend of the friend in interest. In other words, the friend information acquiring unit 103 may generate the friend distribution based on the area of residence of a friend identified based on the area of residence of a friend of that friend. When the friend information acquiring unit 103 cannot acquire the area of residence information of a friend account, the friend information acquiring unit 103 may exclude the information concerning that friend account from the information for generating the friend distribution.

Next, the area of activity estimating device 100 generates a friend distribution of the friend account (S108). The friend distribution generating unit 104 generates the friend distribution based on the area of residence information of each of the extracted plurality of friend accounts. In this example, the friend distribution generating unit 104 obtains the friend distribution $p(L_f)$ through the expression (2) below by use of the kernel density estimation function, as in the case of the posting distribution. The friend distribution $p(L_f)$ is a set of kernel density estimation values (scores) of the friend information in each distribution area.

$$p(L_f) = \frac{1}{|f|h_f} \sum_{1}^{f} w_f K_f(l_f) \quad (2)$$

In the expression (2), $l_f$ is a set of places of residence of the friends, $h_f$ is the bandwidth for friend, $w_f$ is the weight for friend, and $k_f$ is the kernel function for friend. The bandwidth for friend takes a predetermined value for a friend distribution. As with the bandwidth for posting, the bandwidth for friend may be set in advance or may take a value obtained through training on the places of residence of a plurality of friends. The bandwidth for friend may be different from or the same as the bandwidth for posting. The bandwidth for friend may be changed in accordance with the output area of activity (the result of the estimation).

The weight for friend in the expression (2) is a weight of the friend information (the area of residence) in the friend distribution that is based on each piece of friend information (the account information). The weight for friend indicates the degree of importance of each piece of friend information and sets the magnitude of the score. In one example, the weight for friend may be a weight that is based on a time frame in which that friend has become friends with (had a friend relation with, had a connection with) the target user. For example, when the date and time at which the friend has become friends with the target user can be acquired, friend information of an older friend is assigned a lower weight (not given much importance), and a newer friend is assigned a higher weight (given importance). This is done for the following reason. If the target user has moved, a long time friend is likely to be living in the neighborhood of the original address. Contrary to the above, a new friend may be assigned a weight so as to be given less importance. For example, if the target user has a city that he or she has a longing for or wants to live in, the target user is estimated to have made friends with someone living in that city to gather information about the city before the target user moves to the city. In such a case, an older friend may be given more importance. In one specific method of calculating the weight, an initial value (100), for example, may be set in the value of the weight, and the value of this weight may be reduced in accordance with the time that has passed since the target user became friends with the friend. In one simple example, the weight may be obtained through a linear function such as the weight=ax+b (a is a negative value, x is the number of days that have passed, and b is 100 serving as the initial value). Alternatively, a certain reference date may be set, and a predefined weight may be assigned if the target user and the friend have become friends within x days from the reference date, or no weight may be assigned if the target user and the friend have become friends x or more days before the reference date.

Meanwhile, the weight for friend may be a weight associated with the frequency of conversation with the account of the target user indicated, for example, by the number of occurrences of mentions or the number of occurrences of retweets. For example, a friend whose frequency of conversation with the target user is higher than that of other friends is assigned a higher weight (given higher importance). In one specific method of calculating the weight, a friend may be assigned a weight with the total number of conversations that the target user engages in serving as the denominator and with the number of conversations that the target user engages in with each friend as the numerator. Alternatively, a friend who engages in conversations with the target user no less than predefined times may be assigned a weight, and a friend who engages in conversations with the target user less than the predefined times may be assigned no weight.

Furthermore, the weight for friend may be a weight that is based on the degree of reliability of the friend account. Since there are fake accounts providing false information among social media users, if such a fake account is included in friends, the estimation may be made without giving importance to the information from such a friend. The degree of reliability indicates the degree of reliability of an account, and the higher the degree of reliability, the higher the reliability. The degree of reliability may be a numerical value index obtained by the distance. The area of activity estimating device 100 may further include a degree of reliability calculating unit (not illustrated), and the degree of reliability calculating unit may obtain the degree of reliability based on the personal attribute information of an account. For example, the degree of reliability calculating unit acquires the personal attribute information (information such as the profile) of a determination target account of which the degree of reliability is to be obtained and the personal attribute information of a friend account of the determination target account and estimates the personal attribute of the determination target account based on the personal attribute information of the friend account. When the personal attribute information of the friend account includes the area of residence, the degree of reliability calculating unit estimates the area of residence of the user holding the determination target account based on the physical distance from the area of residence of the friend account. Moreover, the degree of reliability calculating unit calculates the degree of reliability based on the distance between the acquired personal attribute information (the area of residence) of the determination target account and the estimated personal attribute information (the area of residence) of the determination target account. For example, the degree of reliability (or the value that is based on the degree of reliability) obtained by the degree of reliability calculating unit is used as the weight for friend.

Moreover, the weight for friend may be a weight that is based on the degree of offline friendship of a friend. An offline friend is, among friend accounts who are friends with the target user on social media, a friend who is friends with the target user also in the physical space (the real world). The estimation may be made with information concerning such an offline friend given more importance than information concerning online friends. The degree of offline friendship indicates whether the offline friend relationship exists in the physical space as well. The area of activity estimating device 100 may further include an offline friend identifying unit, and the offline friend identifying unit may calculate the scare indicating the degree of offline friendship for each friend account of the target user. Specific examples of the offline friend identifying unit and the method of calculating the degree of offline friendship will be described in later example embodiments. For example, the degree of offline friendship (or the value that is based on the degree of offline friendship) obtained by the offline friend identifying unit is used as the weight for friend.

Figure 6:
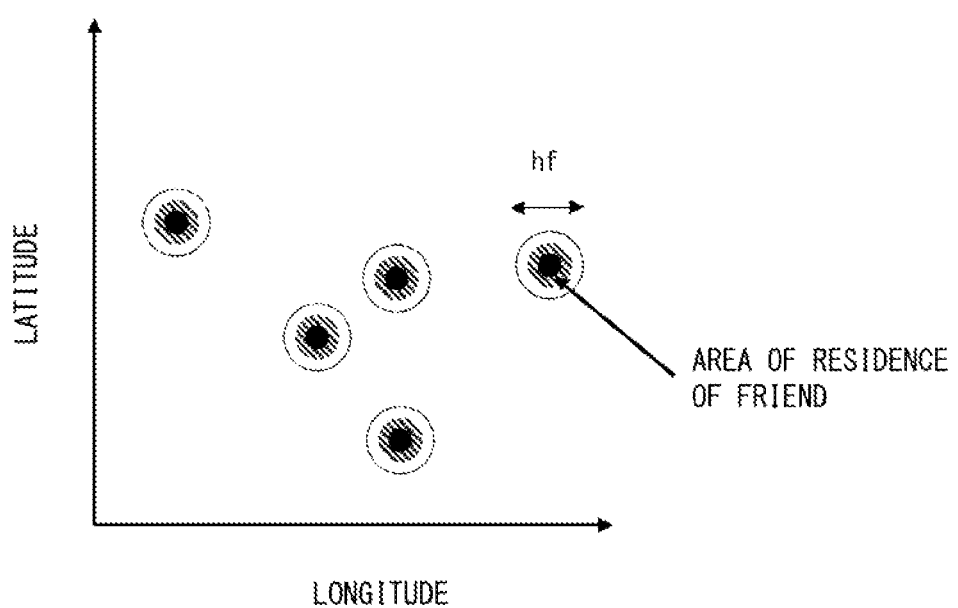
FIG. 6 illustrates an example of how a friend distribution is generated according to the first example embodiment.

FIG. 6 provides an image of a friend distribution obtained through the kernel density estimation. As illustrated in FIG. 6, as with the posting distribution, the area of residence of each friend is plotted on the two-dimensional coordinates of the latitude and the longitude, and with the area of residence of each friend lying at the center, each distribution indicates the range of influence of the bandwidth for friend (e.g., a normal distribution circle).

After generating the posting distribution and the friend distribution, the area of activity estimating device 100 generates an area of activity distribution of the target user (S109). The area of activity estimating unit 105 generates the area of activity distribution of the target user by superposing the posting distribution and the friend distribution in the same area (space) on each other. For example, the area of activity estimating unit 105 estimates the area of activity $l_t$ (an estimated area of activity) of the target user by obtaining the product of the posting distribution and the friend distribution obtained through the expression (1) and the expression (2) described above, as indicated by the expression (3) and the expression (4) below.

$$l_t = \mathrm{argmax}\, p(L), \quad (3)$$

$$p(L) \propto \left\{ \frac{1}{|f| h_f} \sum_1^f w_f K_f(l_f) \right\} \left\{ \frac{1}{|f| h_p} \sum_1^p w_p K_p(l_p) \right\} \quad (4)$$

In the expression (3), L is a set of $l_f$ and $l_p$. As indicated by the expression (4), the score p(L) of each distribution area is proportional to the score of the posting distribution and the score of the friend distribution, and as indicated by the expression (3), the area with the highest score p(L) is estimated as the area of activity.

Figure 7:
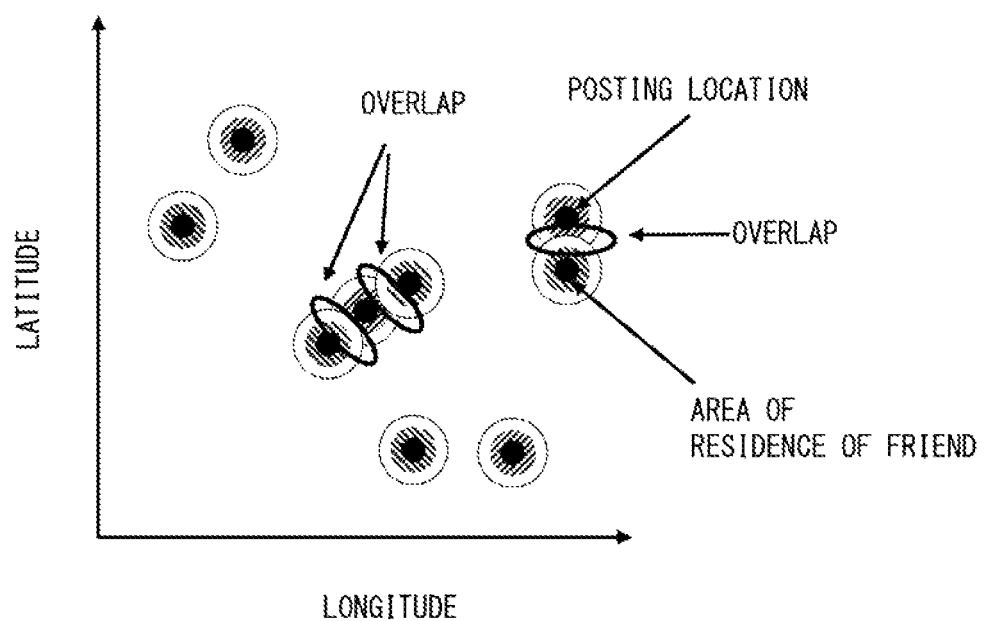
FIG. 7 illustrates an example of how an area of activity distribution is generated according to the first example embodiment.

FIG. 7 provides an image in which the posting distribution and the friend distribution are superposed on each other in the same space (coordinates). As illustrated in FIG. 7, the range of influence of each location in the posting distribution and the range of influence of each location in the friend distribution are superposed on each other. The location where the area of residence of a friend overlaps the distribution of a posting location is an area of activity, and the location with a larger amount of overlap (a denser location) is regarded as the area of activity.

Figure 8:
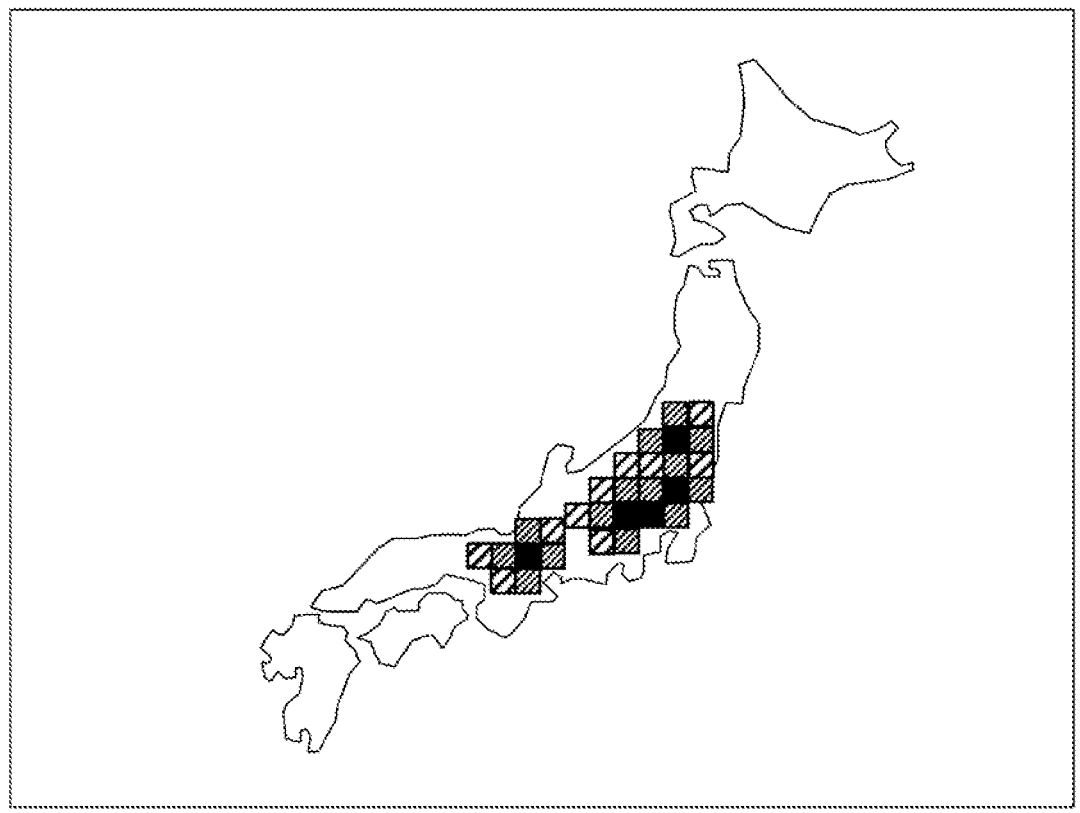
FIG. 8 illustrates an example of how an area of activity distribution is output according to the first example embodiment.

Next, the area of activity estimating device 100 outputs the generated area of activity distribution (S110). The area of activity output unit 106, for example, displays the generated area of activity distribution in a predetermined format. FIG. 8 illustrates an example of how the area of activity distribution is displayed. As illustrated in FIG. 8, for example, the area of activity distribution is displayed in the form of a heat map. A heat map displays the distribution in colors and densities corresponding to the score of each area on a map (a world map, a map of Japan, a regional map, etc.).

As described above, according to the present example embodiment, a location with a denser trace of activity, such as a location bearing a certain relation, is regarded as an area of activity. Specifically, the distribution that is based on the friend information (the places of residence) and the distribution that is based on the posted information (posting locations) are generated simultaneously and in parallel, and these distributions are superposed on each other to generate an area of activity distribution of the target user.

When the present example embodiment is compared with the techniques disclosed in Non-Patent Literatures 1 and 2, the techniques disclosed in Non-Patent Literatures 1 and 2 require a large amount of data for estimating a position. In other words, the techniques disclosed in Non-Patent Literatures 1 and 2 require a large amount of data with high collection cost to be prepared, including for example a data set for learning the positional relationship between the locations bearing relations and the target users to be estimated, posts of friends that are used directly in the estimation, and friend information of the friend. However, since social media service providers place restrictions on data collection (the amount of data that can be acquired within a predefined period), the technique involving the use of a large amount of data requires high data collection cost. In contrast, the present example embodiment employs an estimation technique where advance model preparation is not necessary, and this renders it unnecessary to prepare a large amount of data. Specifically, the kernel density estimation, where parameter learning involving the use of a large amount of data is not necessary, is used. Moreover, information to be used for the estimation is restricted to the places of residence of friends of the target user and the posting locations of the target user, and thus the data collection cost can be reduced. Furthermore, the collection cost can be reduced in both the learning and the estimation.

The technique disclosed in Non-Patent Literature 1 cannot estimate the position with high accuracy when the target user has a small number of friends or when only a small amount of information can be obtained from a friend. In other words, with the technique disclosed in Non-Patent Literature 1, since an offline friend is identified from friends of the target user and the area of activity of the target user is estimated with importance given to information concerning the identified offline friend, it is difficult to make an estimation when the number of friends is small or the amount of information concerning a friend is small. In contrast, the present example embodiment allows the area of activity of the target user to be estimated based on two types of information. Specifically, information to be used to make an estimation includes the places of residence of friends of the target user and the posting locations of the target user. This configuration makes it possible to estimate the area of activity of even a target user for whom only one of the aforementioned pieces of information can be acquired. Moreover, limiting the information to the two types of information described above makes it possible to reduce the collection cost, as compared to the technique disclosed in Non-Patent Literature 1.

Second Example Embodiment

Now, a second example embodiment will be described with reference to the drawings. In one example described according to the present example embodiment, posted information and friend information are filtered in the area of activity estimating device according to the first example embodiment.

Figure 9:
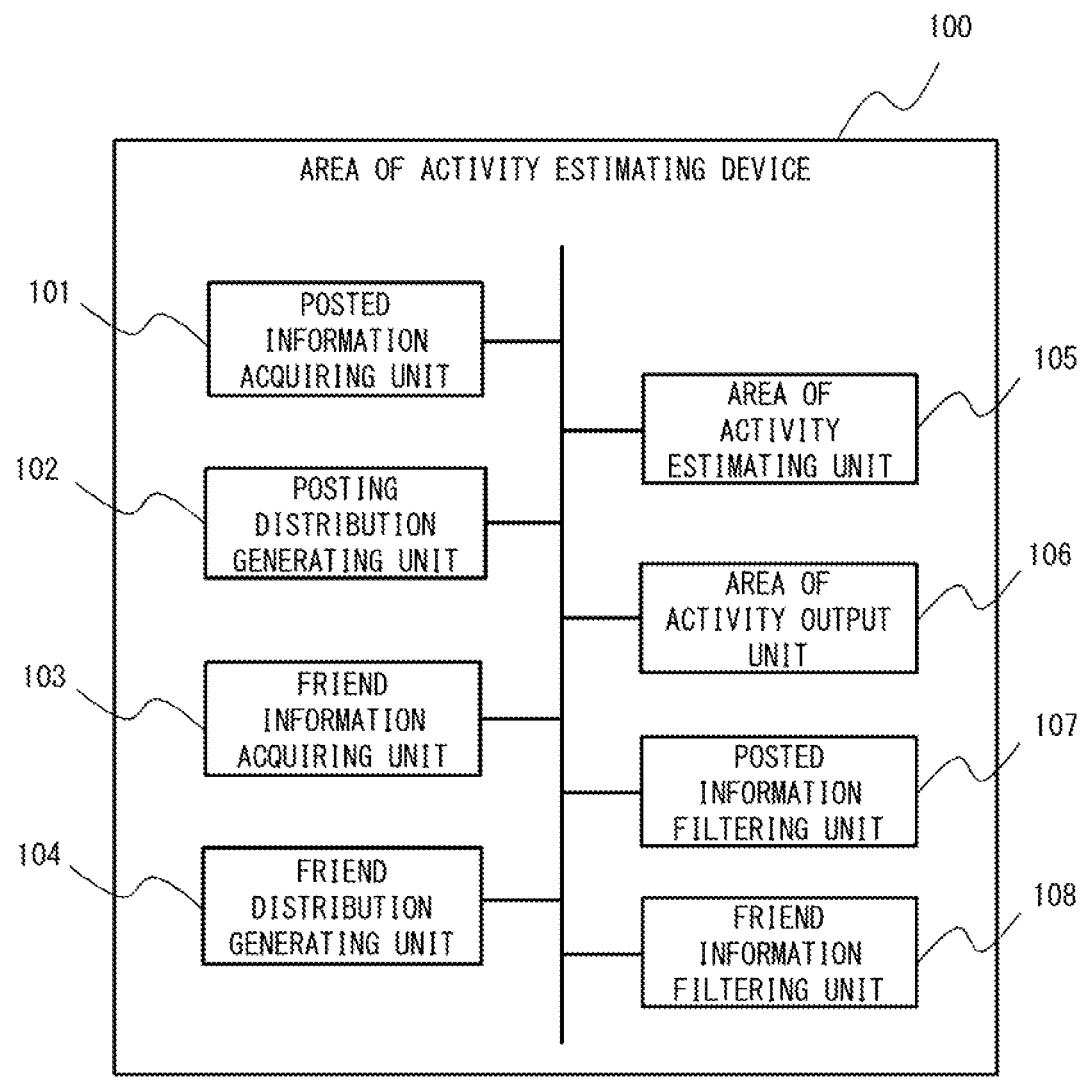
FIG. 9 is a configuration diagram illustrating an example of a configuration of an area of activity estimating device according to a second example embodiment.

FIG. 9 illustrates an example of a configuration of an area of activity estimating device according to the present example embodiment. As illustrated in FIG. 9, an area of activity estimating device 100 according to the present example embodiment includes a posted information filtering unit 107 and a friend information filtering unit 108, in addition to the components according to the first example embodiment.

The posted information filtering unit 107 filters, by a predetermined condition, posted information of a target account that the posted information acquiring unit 101 has acquired. The posted information filtering unit 107 is a selecting unit (a first selecting unit) that selects posted information to be used to generate a posting distribution from a plurality of pieces of posted information included in the account information of the target user. The posted information filtering unit 107 selects posted information based on the granularity of the posting location and excludes, for example, posted information whose granularity of the posting location is greater than a predetermined granularity level. In one specific example, the posted information filtering unit 107 may exclude posted information whose granularity is a country or a prefecture that is greater than the granularity of a municipality. Alternatively, the posted information filtering unit 107 may exclude posted information whose granularity is a one kilometer by one kilometer mesh or a hundred meter by hundred meter mesh that is greater than a ten meter by ten meter mesh.

The friend information filtering unit 108 filters, by a predetermined condition, friend information of a friend account that the friend information acquiring unit 103 has acquired. The friend information filtering unit 108 is a selecting unit (a second selecting unit) that selects area of residence information to be used to generate a friend distribution from a plurality of pieces of area of residence information (base of activity information) included in the account information of a friend. As with the posted information, the friend information filtering unit 108 selects area of residence information based on the granularity of the area of residence information and excludes, for example, friend information whose granularity of the area of residence information is greater than a predetermined granularity level.

Figure 10:
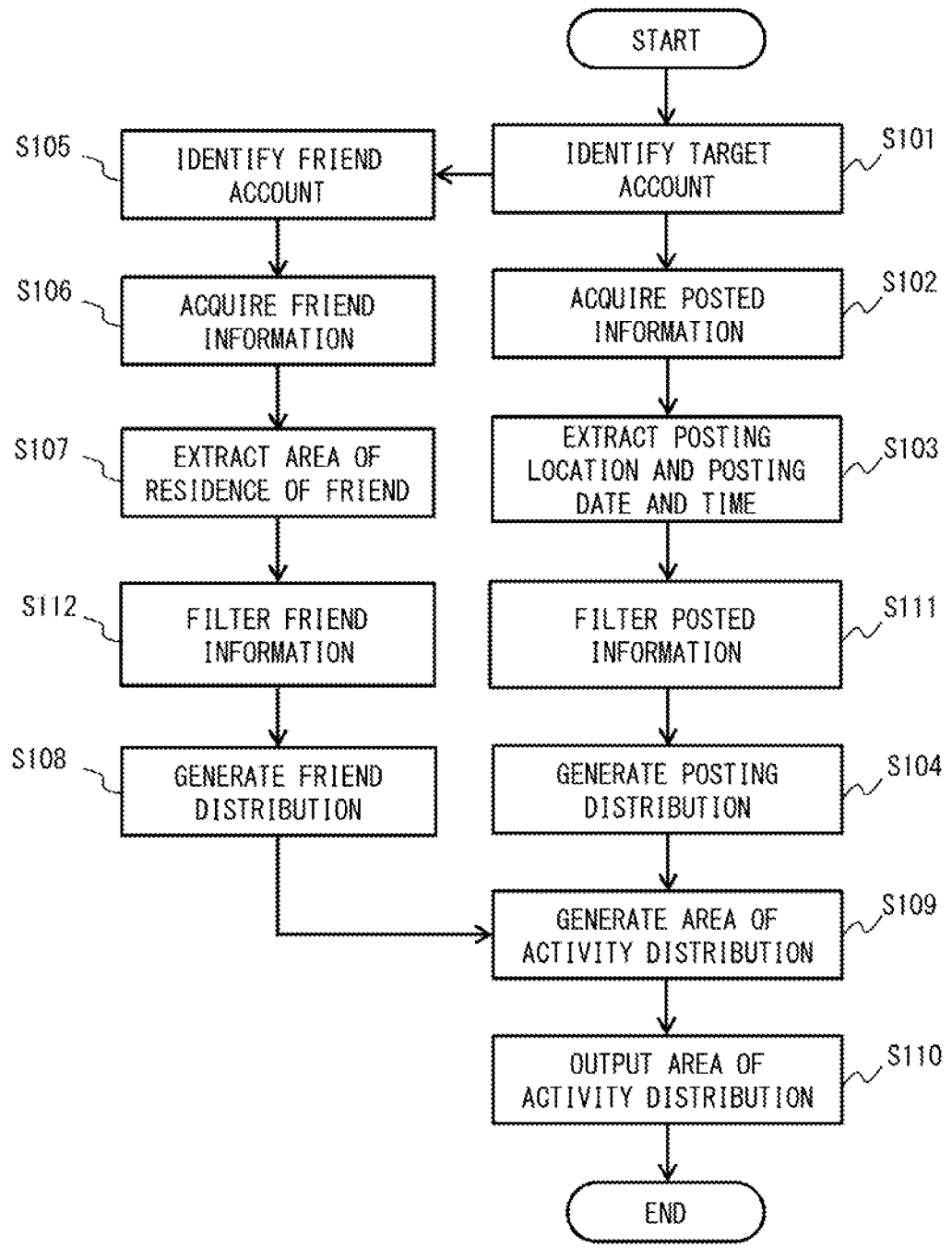
FIG. 10 is a flowchart illustrating an example of an operation of the area of activity estimating device according to the second example embodiment.

FIG. 10 illustrates an example of an operation of the area of activity estimating device according to the present example embodiment. As illustrated in FIG. 10, after the posting location and the posting date and time have been extracted (S103), the posted information filtering unit 107 filters the posted information (S111). The posted information filtering unit 107 determines the granularity of the posting location of each piece of extracted posted information. If the granularity of the posting location is greater than a predetermined granularity level, the posted information filtering unit 107 excludes this posted information from information for generating a posting distribution. For example, the predetermined granularity level is the granularity level of the posting distribution to be generated (or an area of activity distribution to be output). Next, as in the first example embodiment, the posting distribution generating unit 102 generates a posting distribution based on the filtered posted information (S104).

In this example, the posted information is filtered by the granularity of the posting location. Alternatively, the posted information may be filtered by any other criterion. The posted information may be filtered by the posting date and time or the like used to calculate the weight for posting according to the first example embodiment. For example, the posted information filtering unit 107 may exclude posted information whose posting date and time precedes a predetermined date and time.

In this example, the granularity of the posting location serves as the criterion for filtering. Alternatively, the granularity of the posting location may be used as the weight for posting according to the first example embodiment. In other words, the posting distribution may be generated with the weight for posting ($w_p$) used as a weight that is based on the granularity level of the posting location in the expression (1) described above. For example, as the granularity of the posting location is smaller, a more detailed distribution can be generated. Therefore, a higher weight may be assigned as the granularity of the posting location is smaller, and a lower weight may be assigned as the granularity of the posting location is greater.

Meanwhile, after the area of residence information of the friend has been extracted (S107), the friend information filtering unit 108 filters the friend information (S112). As with the posted information, the friend information filtering unit 108 determines the granularity of the area of residence information of each extracted friend. If the granularity of the area of residence information of a friend is greater than a predetermined granularity level, the friend information filtering unit 108 excludes this friend information from information for generating a friend distribution. For example, the predetermined granularity level is the granularity level of the friend distribution to be generated (or an area of activity distribution to be output). Next, as in the first example embodiment, the friend distribution generating unit 104 generates a friend distribution based on the filtered friend information (S108).

As with the posted information, the criterion for filtering is not limited to the granularity of the area of residence information, and the friend information may be filtered by any other criterion. The friend information may be filtered by, for example, the time frame in which the target user and the friend have become friends, the frequency of conversations, the degree of reliability of the friend account, or the degree of offline friendship of the friend used to calculate the weight for friend according to the first example embodiment. For example, the friend information filtering unit 108 may exclude, for example, friend information of which the time frame in which the target user and the friend have become friends precedes (or follows) a predetermined date and time, friend information of which the number of conversations with the target user is no higher than a predetermined number, friend information of which the degree of reliability of the friend account is no higher than a predetermined value, or friend information of which the degree of offline friendship is no higher than a predetermined value.

Moreover, as with the posted information, the granularity of the area of residence information may be used not only as the criterion for filtering but also as the weight for friend according to the first example embodiment. In other words, the friend distribution may be generated with the weight for friend ($w_f$) used as a weight that is based on the granularity level of the area of residence information (the base of activity) of the friend in the expression (2) described above according to the first example embodiment. For example, as with the posted information, a higher weight may be assigned as the granularity of the area of residence information is smaller, and a lower weight may be assigned as the granularity of the area of residence information is greater.

As described above, according to the present example embodiment, posted information for generating a posting distribution and friend information for generating a friend distribution are each filtered by the respective pieces of information. Accordingly, distributions can be generated based on the information of a predetermined granularity level, and thus distributions of a desired accuracy can be obtained.

Third Example Embodiment

Now, a third example embodiment will be described with reference to the drawings. In one example described according to the present example embodiment, a weight is assigned to a posting distribution and a friend distribution to be superposed on each other in the area of activity estimating device according to first example embodiment or the second example embodiment.

Figure 11:
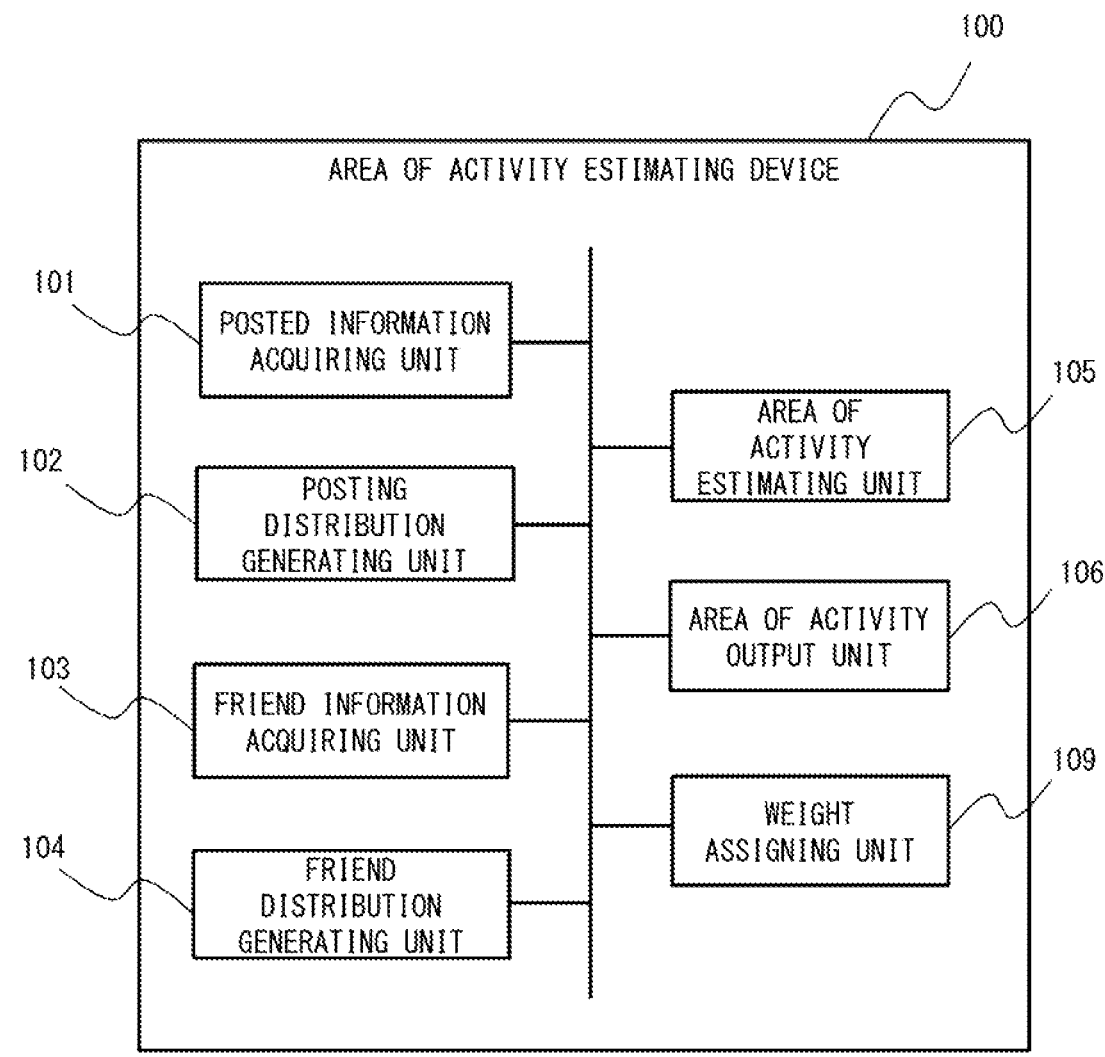
FIG. 11 is a configuration diagram illustrating an example of a configuration of an area of activity estimating device according to a third example embodiment.

FIG. 11 illustrates an example of a configuration of an area of activity estimating device according to the present example embodiment. As illustrated in FIG. 11, an area of activity estimating device 100 according to the present example embodiment includes a weight assigning unit 109, in addition to the components according to the first example embodiment. The weight assigning unit 109 assigns a weight to a posting distribution and a friend distribution to be superposed on each other (assigns a weight of superposition). For example, the weight assigning unit 109 may assign a weight to the friend distribution and the posting distribution in accordance with the number of pieces of friend information in the friend distribution (the number of samples) and the number of pieces of posted information in the posting distribution (the number of samples) and assign a weight in accordance with the difference between the number of pieces of friend information and the number of pieces of posted information. Alternatively, the weight assigning unit 109 may assign a weight to either one of a friend distribution and a posting distribution. The area of activity estimating unit 105 estimates the area of activity of the target user based on the weight of the posting distribution and the friend distribution (or of one of the posting distribution and the friend distribution).

Figure 12:
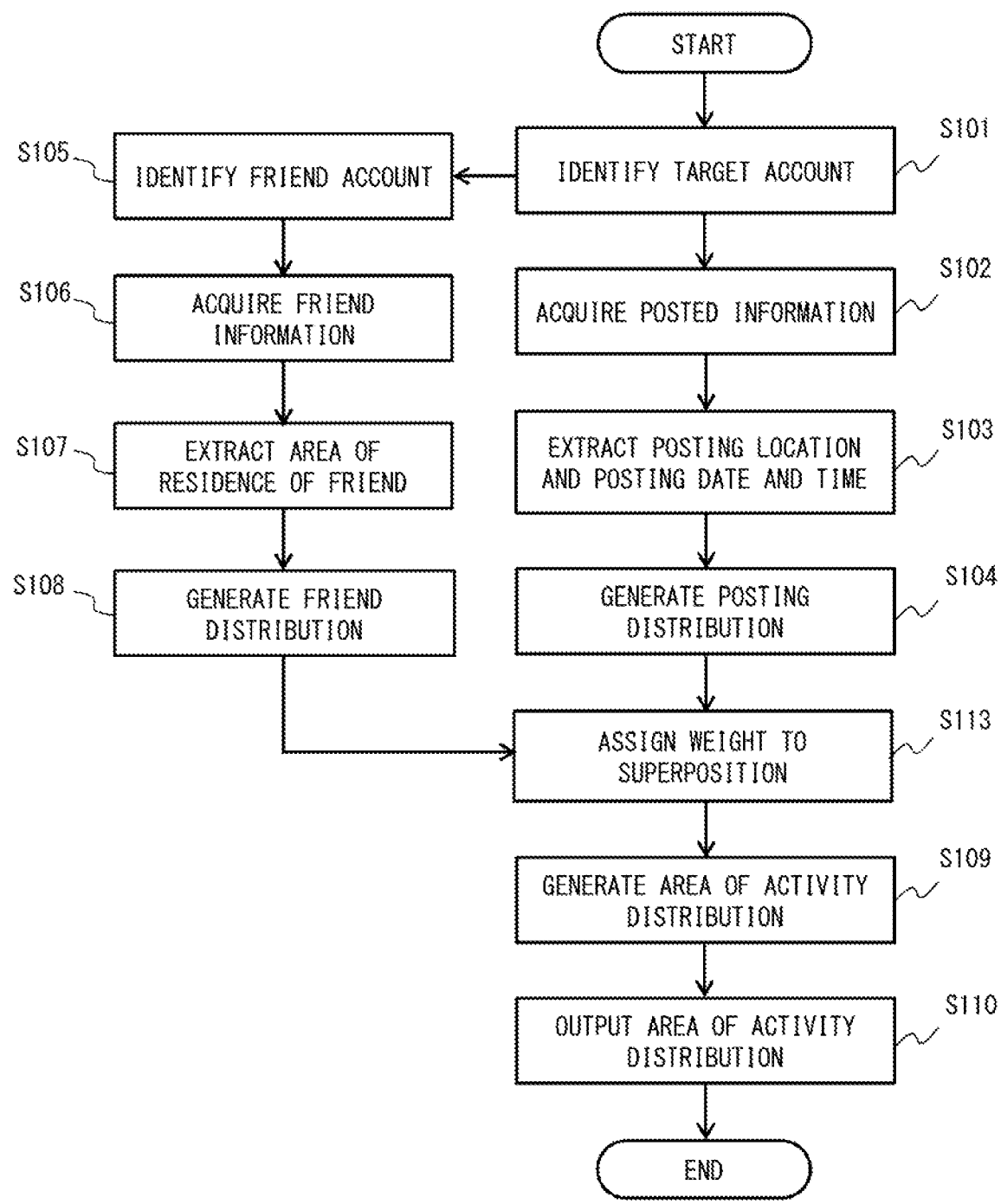
FIG. 12 is a flowchart illustrating an example of an operation of the area of activity estimating device according to the third example embodiment.

FIG. 12 illustrates an example of an operation of the area of activity estimating device according to the present example embodiment. As illustrated in FIG. 12, after the posting distribution has been generated (S104) and after the friend distribution has been generated (S108), the weight assigning unit 109 assigns a weight of superposition to the friend distribution and the posting distribution (S113). The weight assigning unit 109 counts the number of pieces of posted information (posting locations) in the generated posting distribution and the number of pieces of friend information (places of residence) in the generated friend distribution to obtain the difference between the number of pieces of posted information and the number of pieces of friend information, and assigns a weight to the posting distribution and the friend distribution in accordance with the obtained difference. For example, when the difference between the number of pieces of posted information and the number of pieces of friend information is large, either information may be given too much importance. Therefore, the weight assigning unit 109 may balance the number of pieces of posted information and the number of pieces of friend information. For example, when the number of friends is 100 and the number of posts is 200, the weight assigning unit 109 may superpose the friend distribution and the posting distribution with the ratio of 2 to 1.

Next, the area of activity estimating unit 105 generates an area of activity distribution by superposing the weighted friend distribution and posting distribution on each other (S109). For example, as indicated by the expression (5) below, the score p(L) is obtained by multiplying the weight WF of the friend distribution and the weight WP of the posting distribution by their respective distributions.

$$p(L) \propto WF\left\{\frac{1}{|f|h_f}\sum_1^f w_f K_f(l_f)\right\} \cdot WP\left\{\frac{1}{|p|h_p}\sum_1^p w_p K_p(l_p)\right\} \quad (5)$$

As described above, according to the present example embodiment, each distribution is assigned a weight when the friend distribution and the posting distribution are superposed on each other. This configuration makes it possible to estimate the area of activity of the target user with either one of the friend distribution and the posting distribution given more importance. For example, the area of activity can be estimated with a good balance when the distributions are assigned a weight based on the number of friends and the number of posts.

Fourth Example Embodiment

Now, a fourth example embodiment will be described with reference to the drawings. In another example, described below according to the present example embodiment, of assigning a weight of superposition according to the third example embodiment, a weight is assigned to a distribution of online friends and a distribution of offline friends.

Figure 13:
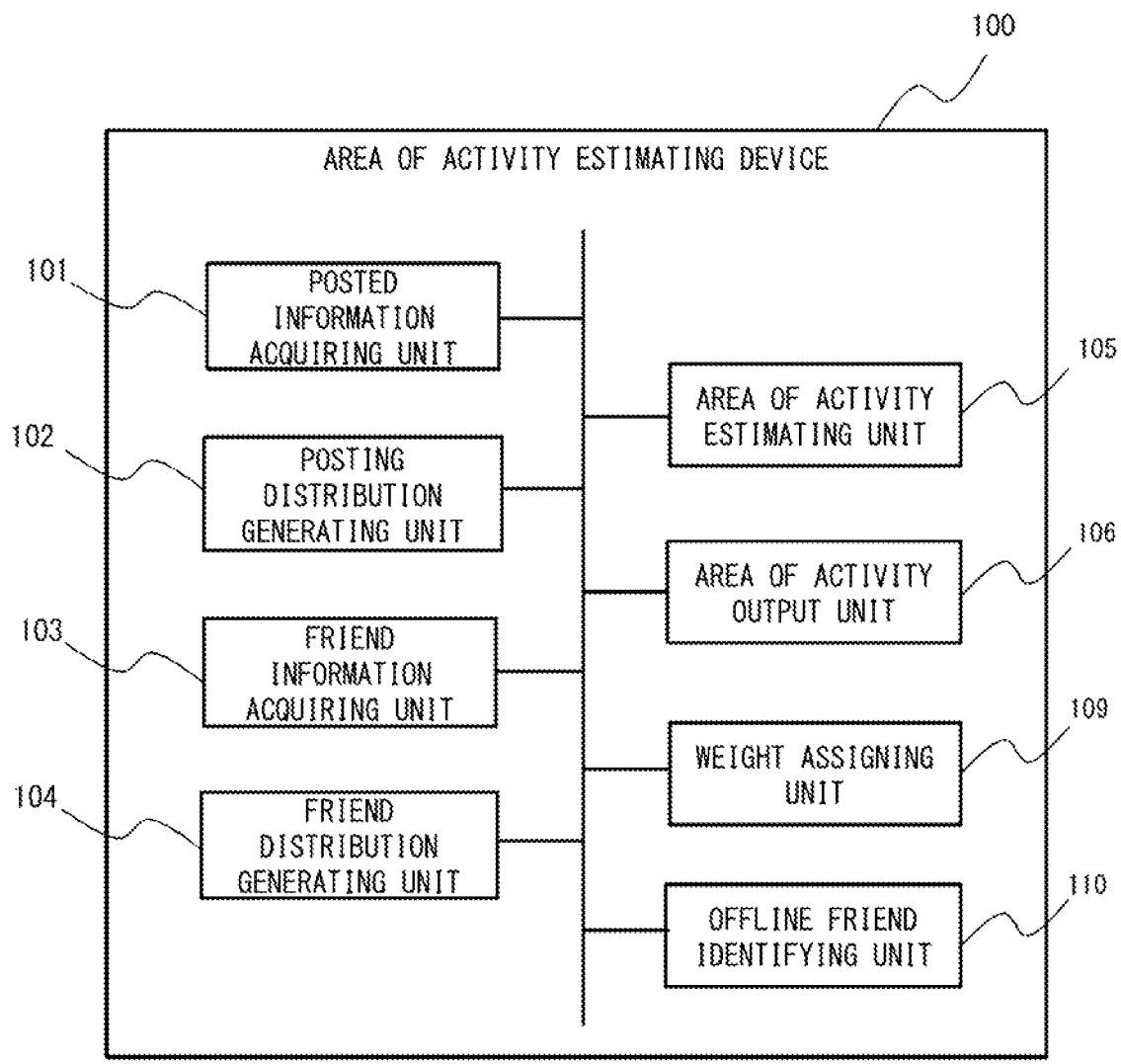
FIG. 13 is a configuration diagram illustrating an example of a configuration of an area of activity estimating device according to a fourth example embodiment.

FIG. 13 illustrates an example of a configuration of an area of activity estimating device according to the present example embodiment. As illustrated in FIG. 13, an area of activity estimating device 100 according to the present example embodiment includes an offline friend identifying unit 110, in addition to the components according to the third example embodiment. The offline friend identifying unit 110 identifies, among friend accounts who are friends with the target user on social media, an offline friend who is friends with (is connected to) the target user in the physical space (the real world). In other words, the offline friend identifying unit 110 identifies, among the friends of the target user, an offline friend and an online friend who is not an offline friend. The area of activity estimating unit 105 estimates the area of activity of the target user based on the posting distribution, the friend distribution of the offline friends, and the friend distribution of the online friends. Moreover, the area of activity estimating unit 105 estimates the area of activity based on the weight of the friend distribution of the offline friends and the friend distribution of the online friends.

Figure 14:
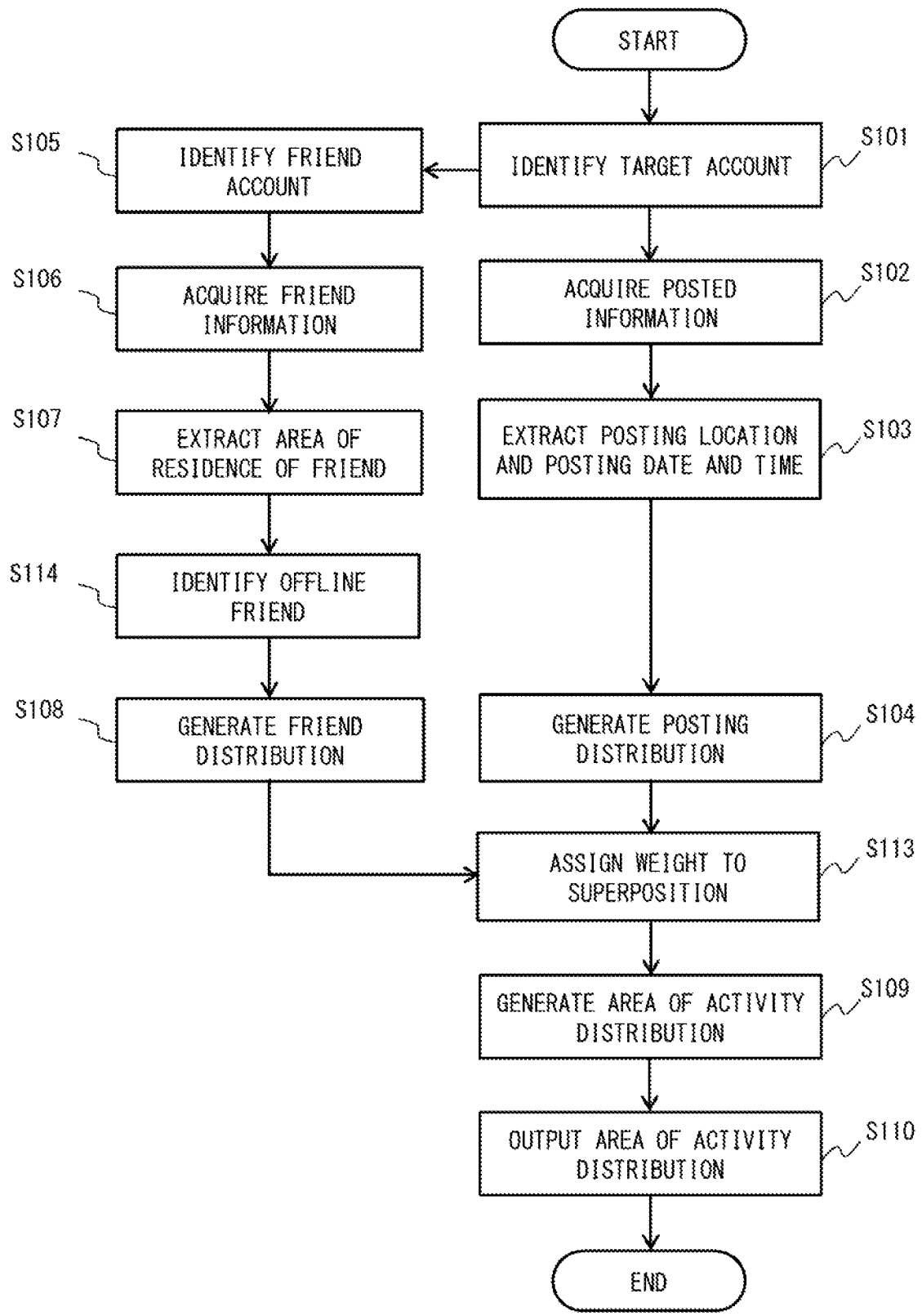
FIG. 14 is a flowchart illustrating an example of an operation of the area of activity estimating device according to the fourth example embodiment.

FIG. 14 illustrates an example of an operation of the area of activity estimating device according to the present example embodiment. As illustrated in FIG. 14, after the places of residence of friends have been extracted (S107), the offline friend identifying unit 110 identifies an offline friend (S114). The offline friend identifying unit 110 determines whether each friend owning a friend account is friends with the target user also in the physical space or is not friends with the target user in the physical space based on the account information of the acquired friend accounts. The offline friend identifying unit 110 obtains the degree of offline friendship of each friend account and identifies an offline friend or an online friend based on the degree of offline friendship. The offline friend identifying unit 110 calculates the score indicating the degree of offline friendship for each friend account of the target user. For example, the offline friend identifying unit 110 sets the degree of offline friendship to a value (e.g., 1) indicating that this friend is an offline friend if the calculated score exceeds a predefined threshold or sets the degree of offline friendship to a value (e.g., 0) indicating that this friend is not an offline friend if the score is no higher than the threshold. The threshold is set as desired by the user of the area of activity estimating device 100, for example.

The offline friend identifying unit 110 may determine whether a friend account is a local account associated with a specific region. For example, a local account is, among social media accounts, an account on the social media managed with its target on a specific location or region. Examples of such local accounts include an account managed by a community-oriented business, such as a local paper, a local government, or a restaurant operated by an independent business owner. The offline friend identifying unit 110 may calculate the degree of offline friendship of a friend based on the result of the determination made on whether the friend account is a local account. For example, the offline friend identifying unit 110 may refer to the friend information of the friend account (the profile information or the posted information) and calculate the score in accordance with the presence or absence of information indicative of whether this account is managed with its target on a specific location or region as well as the amount of such information. Then, the offline friend identifying unit 110 may determine whether this friend account is a local account.

When the offline friend identifying unit 110 has determined that it is unclear whether the friend account is a local account, the offline friend identifying unit 110 may refer to friend information of a friend of that friend account and determine whether the friend account is a local account. For example, the offline friend identifying unit 110 may calculate the degree of offline friendship of a friend account of the target user based on whether the account of a friend of that friend account is a local account. Aside from the above, an offline friend and an online friend may be identified by use of the technique disclosed in Non-Patent Literature 1.

The friend distribution generating unit 104 generates the friend distribution of the identified offline friends and the friend distribution of the online friends (S108). As in the first example embodiment, the friend distribution generating unit 104 generates the friend distribution of the offline friends based on the area of residence information of the offline friends and generates the friend distribution of the online friends based on the area of residence information of the online friends.

Next, the weight assigning unit 109 assigns a weight to the generated friend distribution of the offline friends and the generated friend distribution of the online friends (S113). For example, the offline friends have higher importance with respect to the area of activity of the target user than the online friends do. Therefore, the weight assigning unit 109 assigns a weight so as to give more importance to the friend distribution of the offline friends than to the friend distribution of the online friends.

Next, the area of activity estimating unit 105 generates an area of activity distribution by superposing the weighted friend distribution of the offline friends and the weighted friend distribution of the online friends on the posting distribution (S109). In this example, the area of activity estimating unit 105 may generate an area of activity distribution by superposing only the friend distribution of the offline friends on the posting distribution. For example, as indicated by the expression (6) below, the area of activity estimating unit 105 obtains the score p(L) by multiplying the weight $WF_{off}$ of the friend distribution of the offline friends and the weight $WF_{on}$ of the friend distribution of the online friends by their respective distribution to obtain their products with the posting distribution. It is preferable that the weight for friend in this case do not include the weight that is based on the degree of offline friendship.

$$p(L) \propto WF_{on}\left\{\frac{1}{|f|h_{f1}}\sum_1^f w_{f1}K_f(l_f)\right\} \cdot WF_{off}\left\{\frac{1}{|f|h_{f2}}\sum_1^f w_{f2}K_f(l_f)\right\} \quad (6)$$

In the expression (6), $h_{f1}$ and $w_{f1}$ are values in the friend distribution of the online friends and $h_{f2}$ and $w_{f2}$ are values in the friend distribution of the offline friends. In other words, when the friend distribution for the offline friends and the friend distribution for the online friends are generated, their respective bandwidths or weights for friend may be set to different values. This configuration makes it possible to generate different friend distributions.

As described above, according to the present example embodiment, the friend distributions are separated into a distribution of solely offline friends and a distribution of solely online friends, and a weight is assigned to the distribution of offline friends when this distribution is superposed on the posting distribution. This configuration makes it possible to estimate the area of activity of the target user with the friend distribution of the offline friends given more importance.

As described with reference to some example embodiments thus far, the present disclosure can provide an estimating device, an estimating method, and an estimating program that each make it possible to estimate the area of activity of a target user with a smaller amount of information.

It is to be noted that the present disclosure is not limited to the example embodiments described above, and modifications can be made as appropriate within the scope that does not depart from the technical spirit. For example, when the position information (the area of residence) of a friend account of the target account is to be acquired, if the position information cannot be acquired from the friend account or if the position information is old, the position of the friend account may be estimated by use of the technique for generating the area of activity distribution of the target account according to the foregoing example embodiments. This configuration makes is possible to estimate the position of the friend account even when the friend account of the target user does not include the position information.

Figure 15:
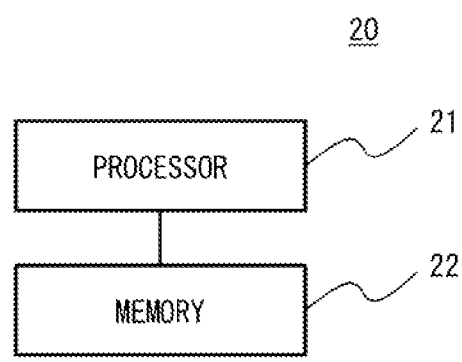
FIG. 15 is a configuration diagram illustrating an overview of hardware of a computer according to some example embodiments.

Each component according to the foregoing example embodiments is constituted by hardware or software or both. Each component may be constituted by one piece of hardware or software or by a plurality of pieces of hardware or software. Each device and each function (process) may be implemented by a computer 20 that includes a processor 21 such as a central processing unit (CPU) and a memory 22 serving as a storage device, as illustrated in FIG. 15. For example, a program for performing a method (an estimating method) according to the example embodiments may be stored in the memory 22, and each function may be implemented as the program stored in the memory 22 is executed by the processor 21.

This program can be stored and provided to a computer by use of various types of non-transitory computer readable media. The non-transitory computer readable media include various types of tangible storage media. Examples of the non-transitory computer readable media include a magnetic storage medium (e.g., a flexible disk, a magnetic tape, a hard-disk drive), a magneto-optical storage medium (e.g., a magneto-optical disk), a CD-ROM (read only memory), a CD-R, a CD-R/W, and a semiconductor memory (e.g., a mask ROM, a programmable ROM (PROM), an erasable PROM (EPROM), a flash ROM, a random access memory (RAM)). Moreover, the program may be supplied to a computer by use of various types of transitory computer readable media. Examples of the transitory computer readable media include an electric signal, an optical signal, and an electromagnetic wave. The transitory computer readable media can supply the program to a computer via a wired communication line, such as an electric wire or an optical fiber, or via a wireless communication line.

A part or the whole of the foregoing example embodiments can also be expressed as in the following supplementary notes, which are not limiting.

(Supplementary Note 1)

An estimating device comprising:

a first position distribution generating unit configured to generate a first position distribution of a target user on social media based on account information of the target user;

a second position distribution generating unit configured to generate a second position distribution of a friend who is friends with the target user on the social media based on account information of the friend; and an estimating unit configured to estimate an area of activity of the target user based on the generated first position distribution and the generated second position distribution.

(Supplementary Note 2)

The estimating device according to Supplementary Note 1, wherein the estimating unit is configured to estimate the area of activity of the target user based on an overlap between the first position distribution and the second position distribution.

(Supplementary Note 3)

The estimating device according to Supplementary Note 1 or 2, wherein the estimating unit is configured to estimate a usual or non-usual area of activity of the target user.

(Supplementary Note 4)

The estimating device according to any one of Supplementary Notes 1 to 3, wherein the first position distribution generating unit and the second position distribution generating unit are configured to generate the first position distribution and the second position distribution, respectively, through a non-parametric technique.

(Supplementary Note 5)

The estimating device according to Supplementary Note 4, wherein the first position distribution generating unit and the second position distribution generating unit are configured to generate the first position distribution and the second position distribution, respectively, by use of a kernel density estimation function.

(Supplementary Note 6)

The estimating device according to Supplementary Note 5, wherein the estimating unit is configured to estimate the area of activity of the target user based on a score of the first position distribution obtained by use of the kernel density estimation function and a score of the second position distribution obtained by use of the kernel density estimation function.

(Supplementary Note 7)

The estimating device according to Supplementary Note 6, wherein the estimating unit is configured to estimate the area of activity of the target user based on a result of a predetermined calculation performed on the score of the first position distribution and the score of the second position distribution.

(Supplementary Note 8)

The estimating device according to any one of Supplementary Notes 1 to 7, wherein the first position distribution generating unit is configured to generate the first position distribution based on posted information included in the account information of the target user.

(Supplementary Note 9)

The estimating device according to Supplementary Note 8, wherein the first position distribution generating unit is configured to generate the first position distribution based on a posting location extracted from the posted information.

(Supplementary Note 10)

The estimating device according to Supplementary Note 9, wherein the first position distribution generating unit is configured to extract the posting location from an image or text included in the posted information.

(Supplementary Note 11)

The estimating device according to any one of Supplementary Notes 8 to 10, wherein the first position distribution generating unit is configured to assign a weight to the posted information in the first position distribution based on the posted information.

(Supplementary Note 12)

The estimating device according to Supplementary Note 11, wherein the first position distribution generating unit is configured to assign the weight based on a posting date and time of the posted information.

(Supplementary Note 13)

The estimating device according to Supplementary Note 11 or 12, wherein the first position distribution generating unit is configured to assign the weight based on a granularity of a posting location of the posted information.

(Supplementary Note 14)

The estimating device according to any one of Supplementary Notes 8 to 13, further comprising a first selecting unit configured to select posted information to be used to generate the first position distribution from a plurality of pieces of posted information included in the account information of the target user.

(Supplementary Note 15)

The estimating device according to Supplementary Note 14, wherein the first selecting unit is configured to select the posted information based on a posting date and time of the posted information.

(Supplementary Note 16)

The estimating device according to Supplementary Note 14 or 15, wherein the first selecting unit is configured to select the posted information based on a granularity of a posting location of the posted information.

(Supplementary Note 17) The estimating device according to any one of Supplementary Notes 1 to 16, wherein the second position distribution generating unit is configured to generate the second position distribution based on base of activity information included in the account information of the friend.

(Supplementary Note 18)

The estimating device according to Supplementary Note 17, wherein the second position distribution generating unit is configured to generate the second position distribution based on an area of residence included in profile information in the account information of the friend.

(Supplementary Note 19)

The estimating device according to Supplementary Note 17 or 18, wherein the second position distribution generating unit is configured to generate the second position distribution based on base of activity information in account information of another friend who is friends with the friend.

(Supplementary Note 20)

The estimating device according to any one of Supplementary Notes 17 to 19, wherein the second position distribution generating unit is configured to assign a weight to the base of activity information in the second position distribution based on the account information of the friend.

(Supplementary Note 21)

The estimating device according to Supplementary Note 20, wherein the second position distribution generating unit is configured to assign the weight based on any of a time frame in which the friend has become friends with the target user, a frequency of conversation between the friend and the target user, a degree of reliability of an account of the friend, a degree of offline friendship of the friend, and a granularity of the base of activity information.

(Supplementary Note 22)

The estimating device according to any one of Supplementary Notes 17 to 21, further comprising a second selecting unit configured to select base of activity information to be used to generate the second position distribution from a plurality of pieces of base of activity information included in the account information of the friend.

(Supplementary Note 23)

The estimating device according to Supplementary Note 22, wherein the second selecting unit is configured to select the base of activity information based on any of a time frame in which the friend has become friends with the target user, a frequency of conversation between the friend and the target user, a degree of reliability of an account of the friend, a degree of offline friendship of the friend, and a granularity of the base of activity information.

(Supplementary Note 24)

The estimating device according to any one of Supplementary Notes 1 to 23, wherein the estimating unit is configured to estimate the area of activity based on a weight assigned to the first position distribution or the second position distribution.

(Supplementary Note 25)

The estimating device according to Supplementary Note 24, wherein the estimating unit is configured to estimate the area of activity based on a weight assigned in accordance with the number of samples in the first position distribution and the number of samples in the second position distribution.

(Supplementary Note 26)

The estimating device according to any one of Supplementary Notes 1 to 25, further comprising an identifying unit configured to identify, among a plurality of friends who are connected with the target user, an offline friend who is friends with the target user in a physical space, wherein the second position distribution generating unit is configured to generate a position distribution of the offline friend and a position distribution of an online friend who is not the offline friend, and the estimating unit is configured to estimate the area of activity of the target user based on the first position distribution, the position distribution of the offline friend, and the position distribution of the online friend.

(Supplementary Note 27)

The estimating device according to Supplementary Note 26, wherein the estimating unit is configured to estimate the area of activity based on a weight assigned to the position distribution of the offline friend and the position distribution of the online friend.

(Supplementary Note 28)

The estimating device according to any one of Supplementary Notes 1 to 27, further comprising an output unit configured to output the estimated area of activity in a list format or a heat map format of colors corresponding to the first position distribution and the second position distribution.

(Supplementary Note 29)

An estimating method comprising:

generating a first position distribution of a target user on social media based on account information of the target user;

generating a second position distribution of a friend who is friends with the target user on the social media based on account information of the friend; and estimating an area of activity of the target user based on the generated first position distribution and the generated second position distribution.

(Supplementary Note 30)

An estimating program that causes a computer to execute the processes of:

generating a first position distribution of a target user on social media based on account information of the target user;

generating a second position distribution of a friend who is friends with the target user on the social media based on account information of the friend; and estimating an area of activity of the target user based on the generated first position distribution and the generated second position distribution.

The first and fourth embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. An estimating device comprising:
at least one memory storing instructions; and
at least one processor configured to execute the instructions stored in the memory to:
generate a first position distribution of a target user on social media based on account information of the target user;
generate a second position distribution of a friend who is friends with the target user on the social media based on account information of the friend;
estimate an area of activity of the target user based on the generated first position distribution and the generated second position distribution,
identify, among a plurality of friends who are connected with the target user, an offline friend who is friends with the target user in a physical space,
generate a position distribution of the offline friend and a position distribution of an online friend who is not the offline friend, and
estimate the area of activity of the target user based on the first position distribution, the position distribution of the offline friend, and the position distribution of the online friend.

2. The estimating device according to claim 1, wherein the at least one processor is further configured to execute the instructions stored in the at least one memory to estimate the area of activity of the target user based on an overlap between the first position distribution and the second position distribution.

3. The estimating device according to claim 1, wherein the at least one processor is further configured to execute the instructions stored in the at least one memory to estimate a usual or non-usual area of activity of the target user.

4. The estimating device according to claim 1, wherein the at least one processor is further configured to execute the instructions stored in the at least one memory to generate the first position distribution and the second position distribution, respectively, through a non-parametric technique.

5. The estimating device according to claim 4, wherein the at least one processor is further configured to execute the instructions stored in the at least one memory to generate the first position distribution and the second position distribution, respectively, by use of a kernel density estimation function.

6. The estimating device according to claim 5, wherein the at least one processor is further configured to execute the instructions stored in the at least one memory to estimate the area of activity of the target user based on a score of the first position distribution obtained by use of the kernel density estimation function and a score of the second position distribution obtained by use of the kernel density estimation function.

7. The estimating device according to claim 1, wherein the at least one processor is further configured to execute the instructions stored in the at least one memory to generate the first position distribution based on posted information included in the account information of the target user.

8. The estimating device according to claim 7, wherein the at least one processor is further configured to execute the instructions stored in the at least one memory to generate the first position distribution based on a posting location extracted from the posted information.

9. The estimating device according to claim 7, wherein the at least one processor is further configured to execute the instructions stored in the at least one memory to assign a weight to the posted information in the first position distribution based on the posted information.

10. The estimating device according to claim 7, wherein the at least one processor is further configured to execute the instructions stored in the at least one memory to select posted information to be used to generate the first position distribution from a plurality of pieces of posted information included in the account information of the target user.

11. The estimating device according to claim 1, wherein the at least one processor is further configured to execute the instructions stored in the at least one memory to generate the second position distribution based on base of activity information included in the account information of the friend.

12. The estimating device according to claim 11, wherein the at least one processor is further configured to execute the instructions stored in the at least one memory to generate the second position distribution based on an area of residence included in profile information in the account information of the friend.

13. The estimating device according to claim 11, wherein the at least one processor is further configured to execute the instructions stored in the at least one memory to generate the second position distribution based on base of activity information in account information of another friend who is friends with the friend.

14. The estimating device according to claim 11, wherein the at least one processor is further configured to execute the instructions stored in the at least one memory to assign a weight to the base of activity information in the second position distribution based on the account information of the friend.

15. The estimating device according to claim 11, wherein the at least one processor is further configured to execute the instructions stored in the at least one memory to select base of activity information to be used to generate the second position distribution from a plurality of pieces of base of activity information included in the account information of the friend.

16. The estimating device according to claim 1, wherein the at least one processor is further configured to execute the instructions stored in the at least one memory to estimate the area of activity based on a weight assigned to the first position distribution or the second position distribution.

17. The estimating device according to claim 1, wherein the at least one processor is further configured to execute the instructions stored in the at least one memory to output the estimated area of activity in a list format or a heat map format of colors corresponding to the first position distribution and the second position distribution.

18. An estimating method comprising:
generating a first position distribution of a target user on social media based on account information of the target user;
generating a second position distribution of a friend who is friends with the target user on the social media based on account information of the friend;
estimating an area of activity of the target user based on the generated first position distribution and the generated second position distribution,
identifying, among a plurality of friends who are connected with the target user, an offline friend who is friends with the target user in a physical space,
generating a position distribution of the offline friend and a position distribution of an online friend who is not the offline friend, and
estimating the area of activity of the target user based on the first position distribution, the position distribution of the offline friend, and the position distribution of the online friend.

19. A non-transitory computer readable medium storing an estimating program that causes a computer to execute the processes of:
generating a first position distribution of a target user on social media based on account information of the target user;
generating a second position distribution of a friend who is friends with the target user on the social media based on account information of the friend;
estimating an area of activity of the target user based on the generated first position distribution and the generated second position distribution,
identifying, among a plurality of friends who are connected with the target user, an offline friend who is friends with the target user in a physical space,
generating a position distribution of the offline friend and a position distribution of an online friend who is not the offline friend, and
estimating the area of activity of the target user based on the first position distribution, the position distribution of the offline friend, and the position distribution of the online friend.

* * * * *